US007400329B2

(12) United States Patent
Edwards

(10) Patent No.: US 7,400,329 B2
(45) Date of Patent: Jul. 15, 2008

(54) GRAPHICS IMAGES SYSTEM AND METHOD

(75) Inventor: David Cole Edwards, Richardson, TX (US)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 122 days.

(21) Appl. No.: 11/393,214

(22) Filed: Mar. 30, 2006

(65) Prior Publication Data

US 2007/0018997 A1 Jan. 25, 2007

Related U.S. Application Data

(60) Provisional application No. 60/694,785, filed on Jun. 28, 2005, provisional application No. 60/694,496, filed on Jun. 28, 2005, provisional application No. 60/694,569, filed on Jun. 28, 2005.

(51) Int. Cl.
*G09G 5/02* (2006.01)
*G09G 5/36* (2006.01)
*G06K 9/36* (2006.01)
*G06K 9/32* (2006.01)
*A63F 13/00* (2006.01)
*G06T 15/00* (2006.01)
*A63F 9/24* (2006.01)

(52) U.S. Cl. .................... 345/581; 345/419; 345/600; 345/605; 345/549; 382/232; 382/245; 382/299; 463/32

(58) Field of Classification Search .......... 345/600, 345/605, 419, 581, 589, 547–549, 555, 690, 345/649, 657; 463/31–32, 36, 42; 382/232, 382/235, 245, 285, 295–299; 348/430.1
See application file for complete search history.

(56) References Cited

U.S. PATENT DOCUMENTS

| 5,618,045 | A | * | 4/1997 | Kagan et al. ................ 463/40 |
| 5,764,232 | A | | 6/1998 | Oouchi |
| 6,524,189 | B1 | * | 2/2003 | Rautila ................... 463/40 |
| 6,577,766 | B1 | * | 6/2003 | Standridge ............... 382/236 |
| 6,664,958 | B1 | * | 12/2003 | Leather et al. ............ 345/422 |
| 6,664,962 | B1 | * | 12/2003 | Komsthoeft et al. ....... 345/426 |
| 6,781,598 | B1 | * | 8/2004 | Yamamoto et al. ......... 345/629 |
| 6,884,171 | B2 | * | 4/2005 | Eck et al. ................. 463/42 |
| 6,959,110 | B1 | * | 10/2005 | Danskin et al. ............ 382/166 |
| 2001/0026647 | A1 | | 10/2001 | Morita |
| 2006/0056717 | A1 | * | 3/2006 | Cheung et al. ............ 382/236 |
| 2006/0088220 | A1 | * | 4/2006 | Cheung et al. ............ 382/232 |
| 2007/0139235 | A1 | * | 6/2007 | Moriya et al. ............. 341/51 |

OTHER PUBLICATIONS

"High-Performance Java Wireless Technologies," For the Java 2 Platform, Micro Edition, Sun Microsystems, Inc., 2003, 4 pgs.

(Continued)

*Primary Examiner*—Wesner Sajous
(74) *Attorney, Agent, or Firm*—Conley Rose, P.C.; J. Robert Brown, Jr.

(57) ABSTRACT

A system for 3-dimensional gaming on a mobile handset is provided. The system includes a converter component operable to convert a pre-rendered 3-dimensional graphic image having 24-bit color resolution to a 3-dimensional graphic image having 16-bit color resolution. The component further operable such that the 3-dimensional graphic image having 16-bit color resolution is run length encoded. The system includes a mobile handset game operable to use the 3-dimensional run length encoded graphic image having 16-bit color resolution for display on a handset as part of the mobile handset game.

21 Claims, 14 Drawing Sheets

OTHER PUBLICATIONS

"Sun Microsystems Gets You in the Game!" Sun Microsystems, Inc., 2004, 1 pg.

"Games on the Java Platform for Mobile Information," Sun Microsystems, 2004, 2 pgs.

"Game Technologies—Reference—Documentation," http://developers.sun.com/techtopics/gametech/reference/docs/index.html, Jun. 26, 2006, 1 pg.

"Brew Gaming," QUALCOMM Incorporated, http://brew.qualcomm.com/brew/en/developer/brew_gaming/index.html, Jun. 26, 2006, pp. 1-2.

"TGA—Truevision (Targa) File Format," Truevision Incorporated, http://www.faqs.org/faqs/graphics/fileformats-faq/part3/section-146.html, Jun. 26, 2006, 1 pg.

Edwards, David Cole, "Video Gaming System and Method," filed—Mar. 30, 2006, U.S. Appl. No. 11/393,245, Specification (66 pgs.) and Drawings (14 sheets).

Edwards, David Cole, "Tool for Video Gaming System and Method," filed—Mar. 30, 2006, U.S. Appl. No. 11/393,256, Specification (63 pgs.) and Drawings (14 sheets).

Edwards, David Cole, "Mobile Handset Video Game System and Method," filed—Mar. 30, 2006, U.S. Appl. No. 11/393,244, Specification (66 pgs.) and Drawings (14 sheets).

Edwards, David Cole, "Multiplayer Video Gaming System and Method," filed—Mar. 30, 2006, U.S. Appl. No. 11/393,240, Specification (65 pgs.) and Drawings (14 sheets).

Samsung Electronics Co., Ltd.; European Search Report; EP Application No. EP07105226; Aug. 2, 2007; 7 pgs.

Edwards, David Cole.; U.S. Appl. No. 11/393,240; filed Mar. 30, 2006; Office Action mailed Dec. 13, 2007; 18 pgs.

Red Faction, http://www.n-gage.com/en-R1/games/gamedata/red_faction.htm, accessed on Dec. 8, 2007; 2 pgs.

Ashen, http://www.n-gage.com/en-R1/games/gamedata/ashen.thm, accessed on Feb. 8, 2007; 4 pgs.

* cited by examiner

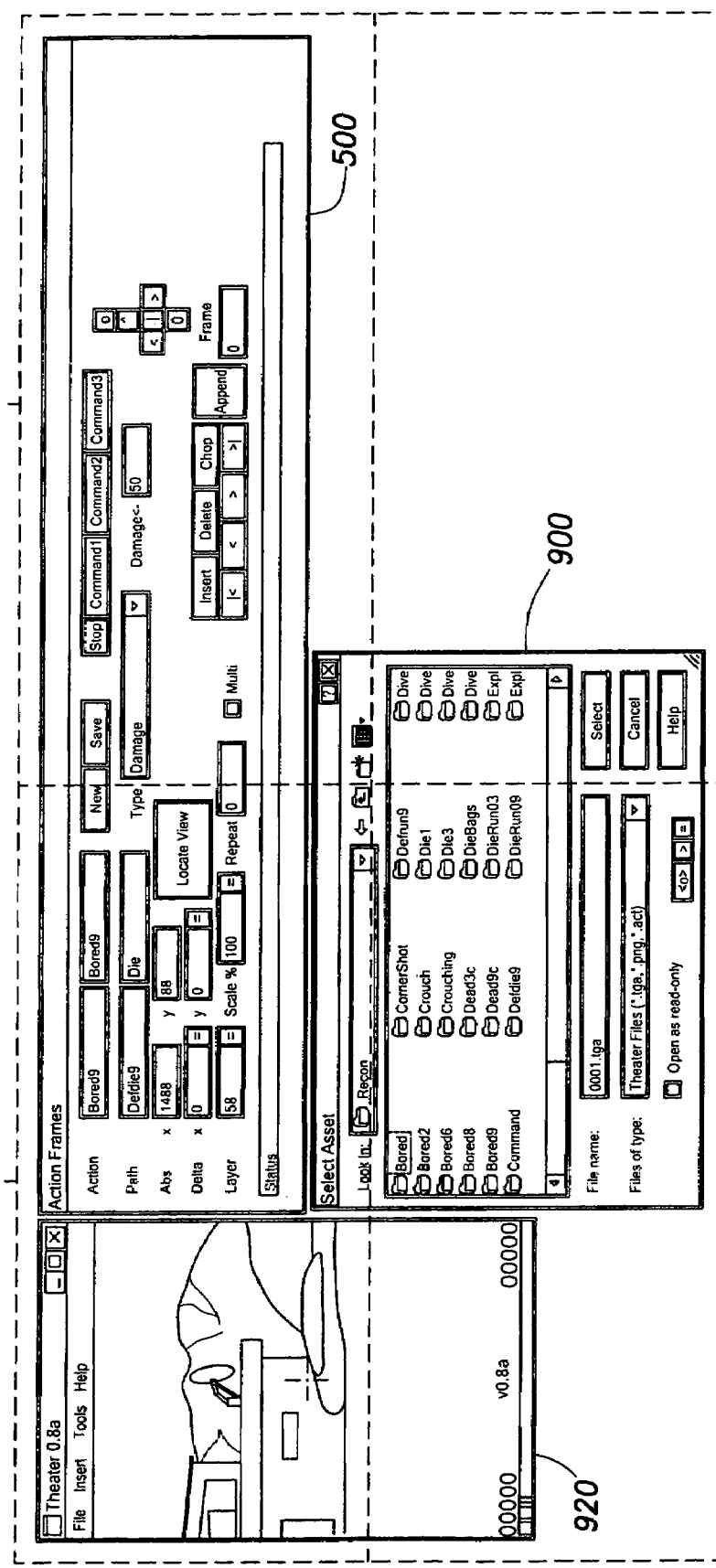

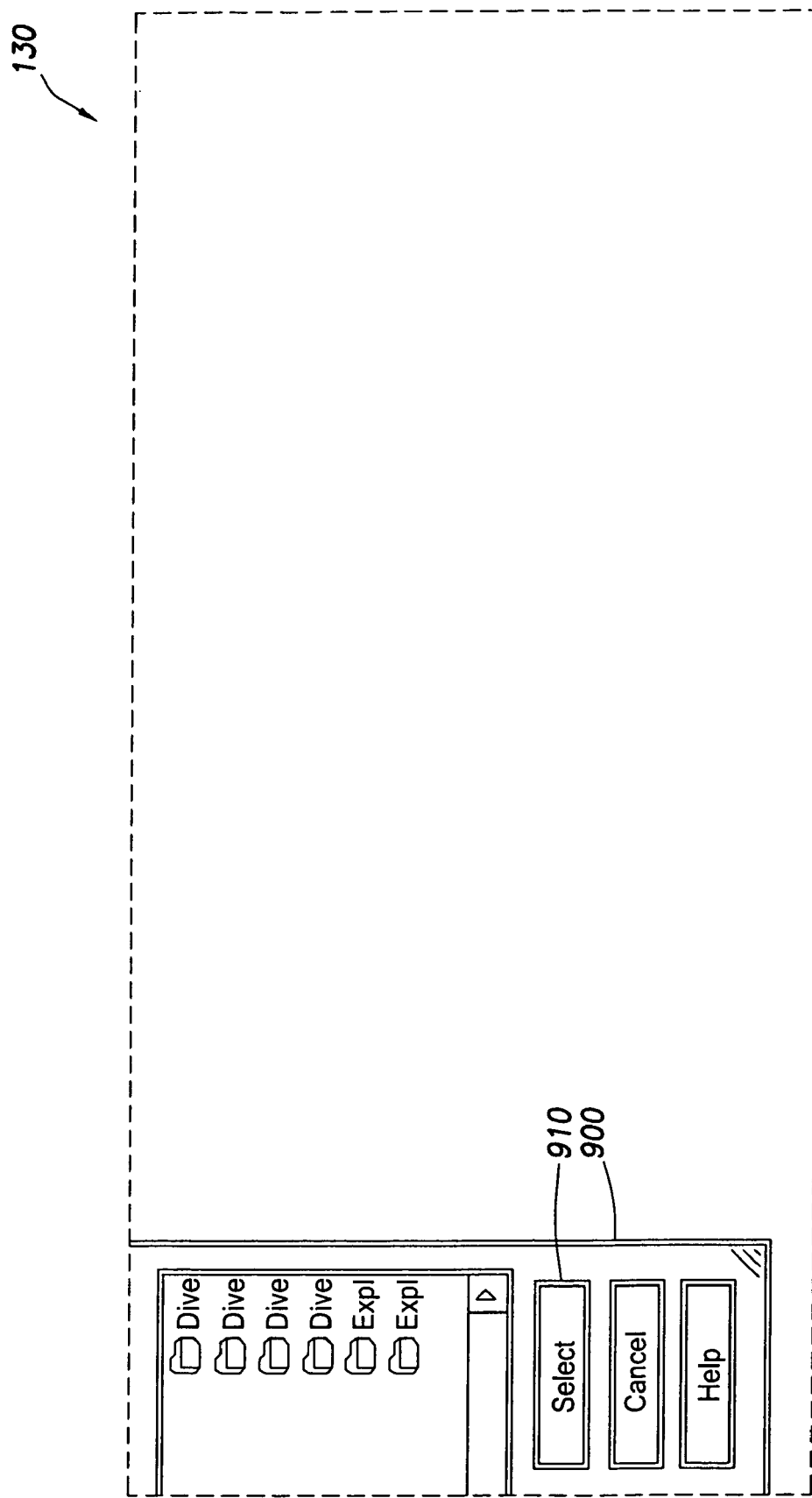

GRAPHICS IMAGES SYSTEM AND METHOD

CROSS-REFERENCE TO RELATED APPLICATIONS

The present application claims the benefit under at least 35 U.S.C. § 119(e) of U.S. Provisional Application No. 60/694,785 filed Jun. 28, 2005 and entitled "PUGS Game Engine for 3-D Gaming on Handsets", U.S. Provisional Application No. 60/694,496 filed Jun. 28, 2005 and entitled ".PIC Format for 3-D Gaming", and U.S. Provisional Application 60/694,569 filed Jun. 28, 2005 and entitled "TGA Format for 3-D Gaming" inventor David C. Edwards, all of which are hereby incorporated herein by reference for all purposes. This application is related to co-pending U.S. patent application Ser. No. 11/393,245, entitled "Video Gaming System and Method", U.S. patent application Ser. No. 11/393,256, entitled "Tool for Video Gaming System and Method", U.S. patent application Ser. No. 11/393,244, entitled "Mobile Handset Video Game System and Method", and U.S. patent application Ser. No. 11/393,240, entitled "Multiplayer Video Game System and Method", inventor David, C. Edwards, all of which are filed on even date herewith and incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to video games for mobile devices and computers. More specifically, but not by way of limitation, a method and a system are provided that allow the playing of games with high-quality graphics on mobile devices with limited memory. A method and a system for developing such games are also provided.

BACKGROUND OF THE INVENTION

Mobile telephones, personal digital assistants (PDAs), and similar hand-held mobile electronic devices sometimes offer additional functions such as the capability to play video games. The games for such mobile devices have tended to become more complex, with more realistic graphics, more complicated game play, and other improvements. Concurrently, the devices themselves have become more sophisticated, with more memory capacity, faster processors, graphics accelerators, and other upgrades. As a result, some games can be played only on expensive, highly sophisticated devices. Development of such games is complex and can require graphic artists and highly skilled programmers. It is not uncommon for video game development to cost well over one million dollars per game.

SUMMARY OF THE INVENTION

According to one embodiment, a system for 3-dimensional gaming on a mobile handset is provided. The system includes a converter component operable to convert a pre-rendered 3-dimensional graphic image having 24-bit color resolution to a 3-dimensional graphic image having 16-bit color resolution. The component further operable such that the 3-dimensional graphic image having 16-bit color resolution is run length encoded. The system includes a mobile handset game operable to use the 3-dimensional run length encoded graphic image having 16-bit color resolution for display on a handset as part of the mobile handset game.

According to another embodiment, a method is provided for 3-dimensional gaming on a mobile handset. The method includes creating a 3-dimensional graphic image, and pre-rendering the graphics image. The method includes run length encoding at least a portion of the pre-rendered graphics image. The method includes displaying the run length encoded pre-rendered graphic image on a mobile handset as part of a game on a mobile handset.

In still other embodiments, a data file structure is provided for graphics images for 3-dimensional gaming on a mobile handset. The data file structure obtained according to a method including converting a plurality of pre-rendered 3-dimensional images having 24-bit color resolution to 3-dimensional graphics images having 16-bit color resolution. The method including run length encoding the 3-dimensional graphics images having 16-bit color resolution. The method including saving the 3-dimensional graphics images having 16-bit color resolution for display for the game on the mobile handsets.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

FIGS. 6 and 6a-6d illustrates an authoring tool that might be used to create games according to an embodiment of the present disclosure.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

A gaming format that can be referred to as 360-3D is disclosed. The 360-3D format allows games with high-quality three-dimensional graphics and complicated storylines to be played on mobile devices with limited memory and processing power. In an embodiment, for example, the mobile device may have a processor executing at about 120 MHz and the memory space available in the mobile device for loading 360-3D game data may be in the range from about 3 megabytes to about 28 megabytes. Typically, to obtain high quality video graphics requires mobile handsets with graphics accelerators. In some embodiments, the present system may operate on mobile handsets that do not have a graphics accelerator. A system and method for developing 360-3D games are also disclosed. The system and method allow developers to easily create 360-3D games by specifying how a set of pre-rendered images will be manipulated on the display of a mobile device. Games can be created without the use of programming code, eliminating the need for programming knowledge or experience and substantially reducing the cost of game development.

Figure 1:
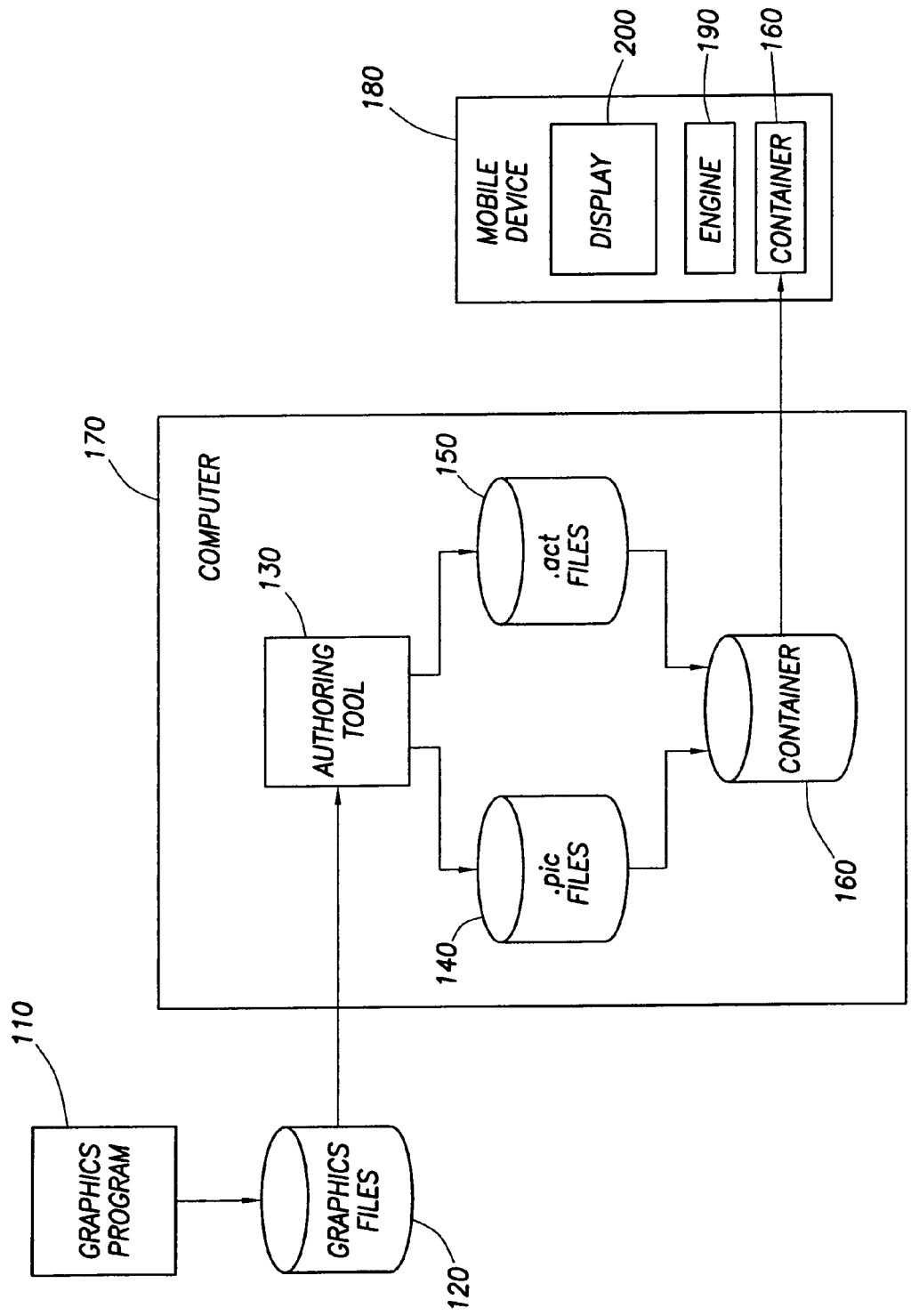
FIG. 1 illustrates a block diagram of a system for game development and play according to an embodiment of the present disclosure.

FIG. 1 is a block diagram of the major components in an embodiment of a 360-3D game development and game execution system. A developer creating a 360-3D game would typically begin the game development process by a using a standard, commercially available graphics program 110 to create a set of three-dimensional images that will be manipulated in the game. As discussed in more detail below, the images are pre-rendered and stored as a set of graphics files 120 in the targa or .tga format.

An authoring tool 130 would then be used to import the graphics files 120 and convert them from the .tga format to a format that can be referred to as .pic files 140. As discussed in more detail below, the conversion from .tga files to .pic files 140 involves compression of the files by the run length encoding process. The authoring tool 130 would then be used to create a set of files that can be referred to as .act or action files 150. Each .act file 150, as discussed below, contains a series of instructions describing how the images in the .pic files 140 are to be manipulated to create a 360-3D game. After the .pic files 140 and the .act files 150 have been created, the files can be stored together as a single set of data files that can be referred to as a container 160.

The authoring tool 130, the .pic files 140, the .act files 150, and the container 160 would typically be present on a single computer 170. While the graphics program 110 and the graphics files 120 are shown in FIG. 1 outside the computer 170, in other embodiments, the graphics program 110 and the graphics files 120 might be present on the same computer 170 as the authoring tool 130, the .pic files 140, the .act files 150, and the container 160.

When a 360-3D game is to be installed on a mobile telephone, a PDA, or a similar device, the container 160 is copied from the computer 170 to the mobile device 180. Alternatively, the container 160 might be stored in an intermediate location before being transferred to the mobile device 180. For example, the container 160 might be available on a web site for download to the mobile device 180 or might be stored on a CD or other storage medium for copying to the mobile device 180. One of skill in the art will be familiar with other manners in which the container 160 might be transferred from the computer 170 to the mobile device 180.

It is anticipated that the files in the container 160 will be in a format that is compatible with both the computer 170 and the mobile device 180 and that no modification of the files will be necessary as part of the transfer process. However, even if minor modifications are necessary for compatibility, the files should be considered substantially equivalent and will be referred to herein as being in the container 160 regardless of whether the container 160 is in the computer 170 or the mobile device 180.

Also present in the mobile device 180 is a runtime engine 190 that can read the files in the container 160. As discussed in more detail below, the engine 190 reads the instructions in the .act files 150 regarding how the images in the .pic files 140 should be manipulated. The engine 190 then retrieves the appropriate .pic files 140, manipulates them as instructed, and displays them on the display screen 200 of the mobile device 180.

The container 160 is typically loaded into a non-volatile memory location in the mobile device 180, such as a flash memory. The files in the container 160 are simple data files rather than executable files, so it is anticipated that problems such as viruses or coding bugs cannot arise when the container 160 is loaded into the mobile device 180.

In the preferred embodiment, the engine 190 is embedded in the operating system of the mobile device 180. The engine 190 might be modified slightly to be compatible with different devices and different operating systems, but substantially the same engine 190 can be installed on any mobile device 180 and can read any container 160. Typically the engine 190 may only be modified to use equivalent operation system calls to initialize a timer function that calls the engine 190 about fifteen times per second, to write to a memory location, to trigger a display update, and to make the engine 190 go dormant. The engine 190 is the only executable portion of a 360-3D game. Once the engine 190 has been tested and debugged for a particular mobile device 180 and operating system, no further testing or debugging is necessary to install a 360-3D game on that type of device 180. When a new 360-3D game is to be installed on a mobile device 180, the container 160 for the game is simply loaded into the device's memory in replacement of or in addition to any existing containers 160 for other games. The engine 190 can then read the new container 160 to execute the new game.

Before discussing in detail how the authoring tool 130 creates 360-3D games and how the runtime engine 190 executes the games, it may be instructive to discuss the format of 360-3D games and the types of gaming action that typically occur in 360-3D games.

360-3D games may fall within the genre known as first-person shooter games. That is, a player of a 360-3D game takes on the perspective of a virtual player present within a scene displayed on the video screen 200 of a mobile device 180. The virtual player is typically capable of some motion within the scene and can typically take some action, such as shooting, toward characters or objects in the scene. It should be understood that the action is not limited to shooting and that other types of interaction between the virtual player and the characters in the scene are possible, as will be familiar to one of skill in the art. For example, the action might be a selection of a character to perform some type of activity. However, for ease of reference, the interactions between the virtual player and the characters will hereinafter be referred to as shooting and/or firing a shot. It should also be understood that the shooting may involve the casting of numerous different types of projectiles at numerous different types of targets. An example is a military action game where a player shoots at other military action figures, such as soldiers, tanks, helicopters, and so on. Other examples include games where a player shoots at dinosaurs, or perhaps sharks from an underwater perspective, or other shooting gallery type games. The game might be a firefighter game where the player shoots water at fires to extinguish the fire's flames. Shooting and/or firing a shot may include spraying, pointing, designating, and/or selecting. Examples of other types of games that may be created with or for the present system will readily suggest themselves to one skilled in the art.

In one embodiment of a 360-3D game, the virtual player remains stationary at a single point in the scene, but can spin freely about that point. That is by turning or rotating in place, either clockwise or counter-clockwise, the virtual player can have a 360° view of a virtual world in the center of which he appears to be located. The background of the scene in which the virtual player spins is a panorama that wraps back to itself seamlessly so that the appearance is created that the virtual player can turn endlessly in a real-world scene. Therefore, the player may turn 360°, 720°, 1080°, and other amounts in either clockwise or counter-clockwise rotational motion.

The real player typically controls the actions of the virtual player by pressing keys on the keypad of the mobile device 180. For example, left and right cursor keys might be used to cause the virtual player to spin to the left or right. An 'Enter' key or other key might be used to fire a shot. In other embodiments, other keys or other means of providing user input could be used to perform these actions.

Figure 2:
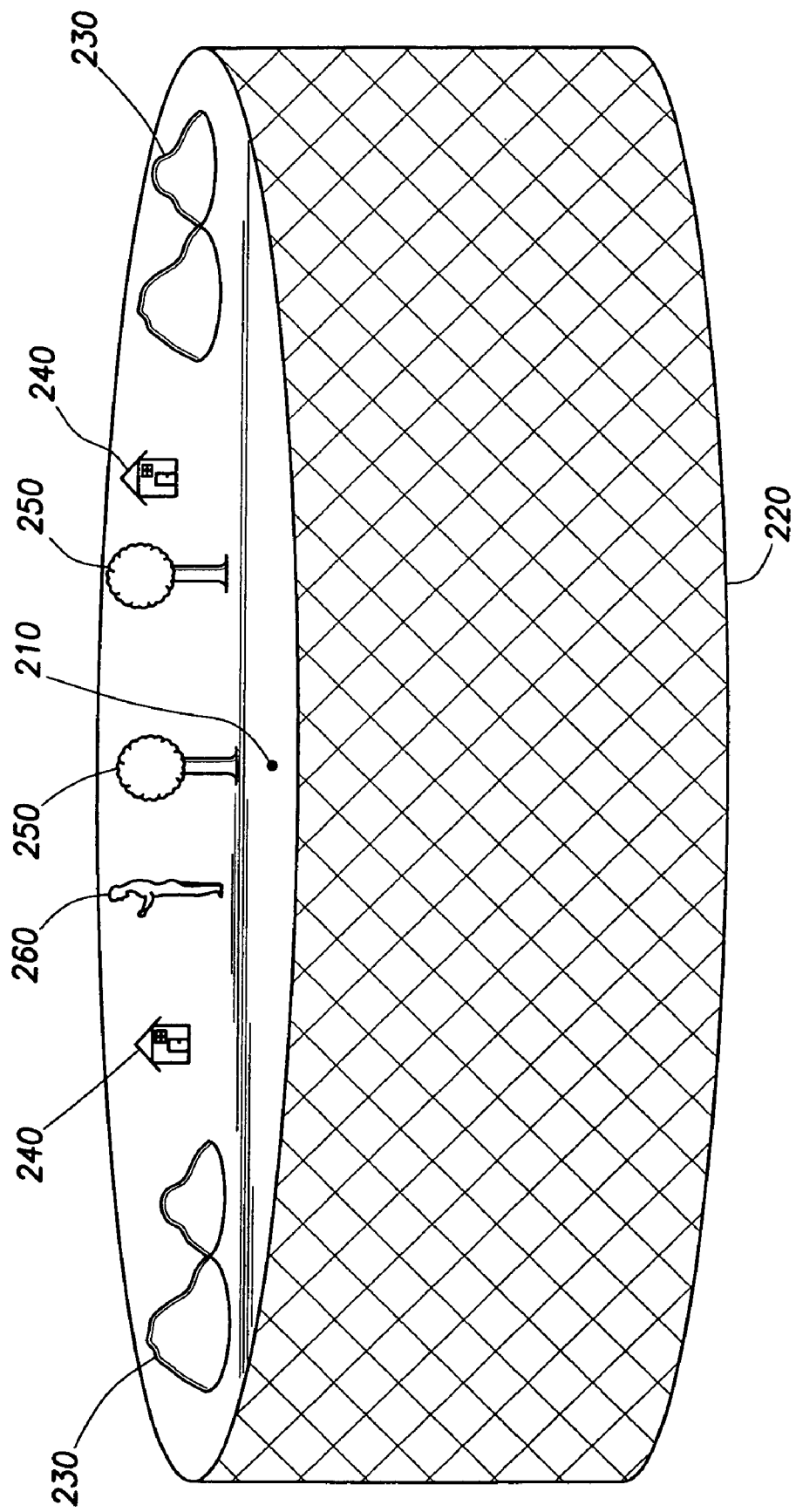
FIG. 2 illustrates an overhead perspective view of a panorama in which scenes in a game might be displayed according to an embodiment of the present disclosure.

FIG. 2 is an overhead perspective view looking down on the virtual player 210 and the circular panorama 220 in which he is centrally located. Objects such as mountains 230 or other scenery might appear in the background, while buildings 240 and other man-made objects, trees 250 and other natural objects, and human, animal, or inanimate characters 260 might appear in the foreground. Background and foreground objects can be scaled appropriately so that a three dimensional appearance is created. As the virtual player 210 spins, different sections of the circular panorama 220 can appear to come into view.

Figure 3:
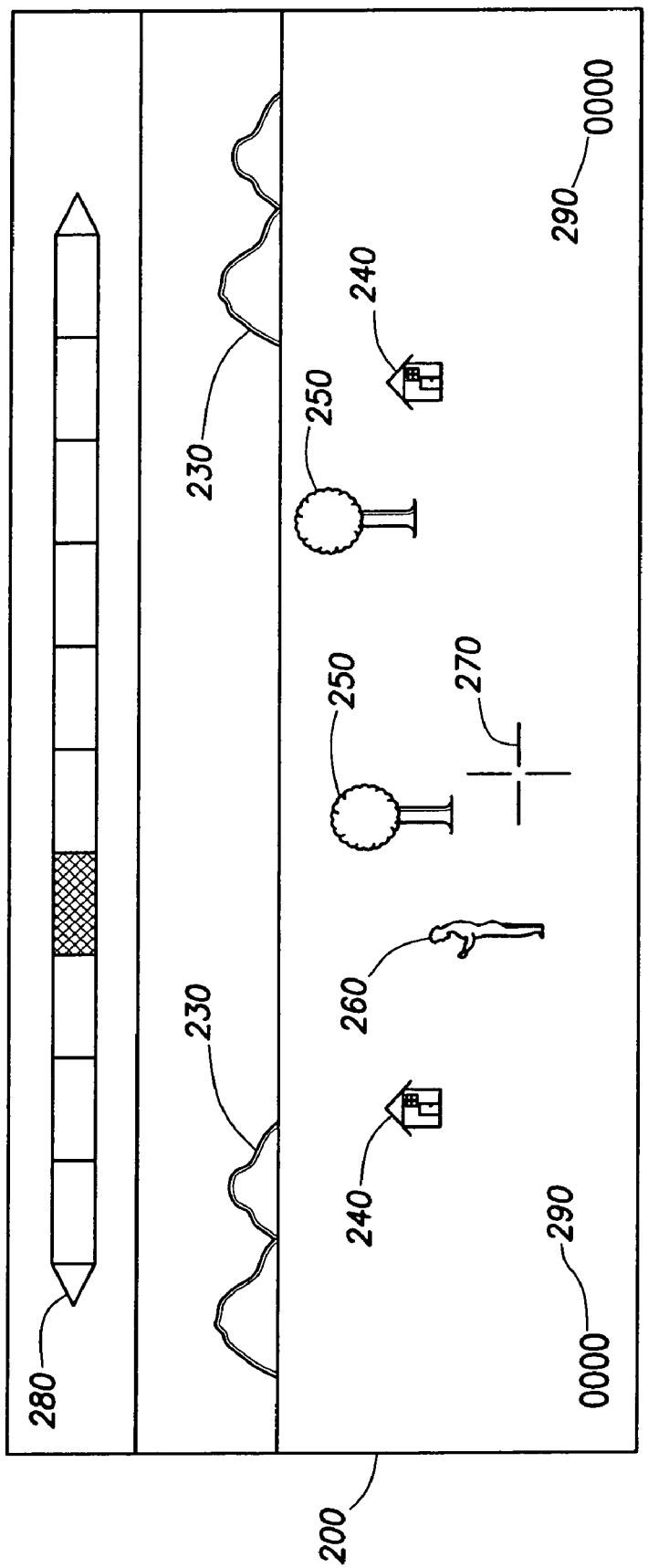
FIG. 3 illustrates a video screen that might display scenes in a game according to an embodiment of the present disclosure.

FIG. 3 is a depiction of a scene that a real player might see on a video display 200 when playing a 360-3D game. In this figure, a portion of the circular panorama 220 is shown and appears to be flat in the display. Mountains 230, buildings 240, trees 250, and characters 260 as arranged on the panorama 220 appear in the display 200. Characters 260, vehicles, and other movable objects can move left and right from the perspective of the virtual player 210 and relative to the background. (Hereinafter, any object capable of moving within the scene will be referred to as a character 260, regardless of whether the object has the appearance of a human, an animal, a vehicle, or some other type of movable object.) Characters 260 can also scale up and down in size to give the appearance of moving toward and away from the virtual player 210. Scaling can also be used to give a sense that stationary objects are closer to or further from the virtual player 210.

The scene contains multiple invisible layers that indicate the depth of a character 260 relative to the background and foreground. When moving left or right, characters 260 move in one of the layers. That is, a character 260 might be as close to the foreground as possible, as close to the background as possible, or at any of several layers between the closest foreground and the furthest background. This allows characters 260 at different layers to appear to move in front of or behind each other, the upper layer character 260 occulting the lower layer character 260 as it passes in front. When scaling up or down in size to create the appearance of moving forward or backward, a character 260 might also change layers.

Figure 4:
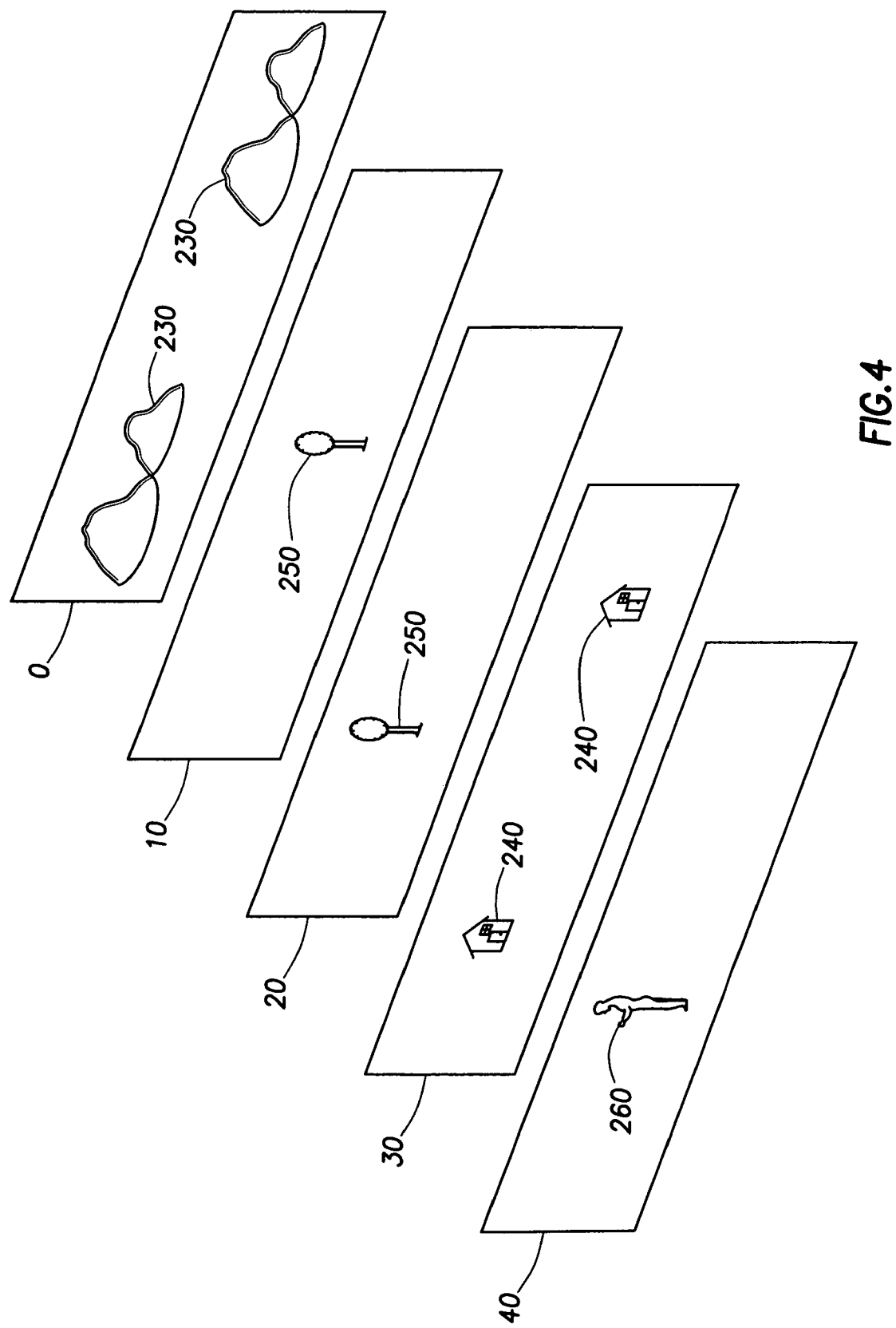
FIG. 4 illustrates the layering that might be present in a scene in a game according to an embodiment of the present disclosure.

FIG. 4 depicts this layering concept. Mountains 230 might be in the furthest layer, or background, which might be referred to as layer 0. A tree 250 might be present in layer 10, which is in front of layer 0, and another tree 250 might be present in layer 20, which is in front of layer 10. Two buildings 240 might be present in layer 30, which is in front of layer 20. A character 260 might be present in layer 40, which is in front of layer 30. While only five layers are shown, in other embodiments other numbers of layers could be present. When all of the layers are displayed simultaneously and appropriate sizes of the objects in the layers are selected, a three-dimensional appearance is created on the screen 200 as objects appear in front of or behind other objects and the associated occulting occurs.

Returning to FIG. 3, crosshairs 270 are present on the screen 200 to show where the virtual player 210 is aiming. In other embodiments, other targeting indicators such as a pointer, an aiming indicator, or a targeting reticle could be used instead of the crosshairs 270. Hereinafter, any such targeting indicator will be referred to as crosshairs 270. The crosshairs 270 are centered on the screen 200 from left to right. The effect of the real player causing the virtual player 210 to spin to the left or to the right is that the images in the scene spin, but the crosshairs 270 remain centered from left to right. The real player can also cause the crosshairs 270 to move up and down using the up and down cursor keys on the keypad of the mobile device 180 or similar input mechanisms. In this way, the real player can attempt to set the crosshairs 270 on a character 260 or other object in the scene. By hitting an appropriate key on the keypad of the mobile device 180 or by providing some other appropriate input, the real player causes an action to be taken at the center of the crosshairs 270 (firing a shot, for example). If the crosshairs 270 are properly positioned on a character 260, the action causes a reaction in the character 260 (wounding the character 260, for example).

The characters 260 have the capability to take actions toward the virtual player 210, such as shooting. The characters 260 can also move into or behind the structures or scenery, for example behind a structure at a higher layer than the subject character 260, preventing the virtual player 210 from shooting them.

A graphic display that can be referred to as the 'radar' 280 appears on the screen 200 and indicates where characters 260 that pose an active threat to the virtual player 210 are located, including any characters 260 that are located outside the currently visible scene. The radar 280 may also be referred to as a threat indicator. The radar 280 will be described in more detail below.

The screen 200 might also include scores 290 that might indicate how many characters 260 the virtual player 210 has killed and/or how many characters 260 the virtual player's partner or competitor has killed in a multi-player game.

Multi-player games will be discussed in detail below. Other status information may be displayed on the screen 200, for example remaining stores, remaining ammunition, and remaining game time.

The general concept for game play for 360-3D games, as with any first-person shooter game, is for the virtual player 210 to kill all the characters 260 before the characters 260 kill the virtual player 210. Again, while the discussion is focused on shooting games, it should be understood that similar concepts could apply to other types of games. It is anticipated that the owners of devices 180 on which 360-3D games are installed will use the devices 180 primarily for their telephony or organizer functions and that the playing of games will be a secondary feature that will be used only occasionally as a temporary diversion. Therefore, the 360-3D games are designed to allow users to quickly and intuitively learn the rules and other features without the need for extensive instructions or practice. Features such as the radar 280, the horizontally centered crosshairs 270 whose vertical position is controlled by specific input keys, firing using a specific input key, and spinning of the virtual player 210 controlled by specific input keys are conventions that will contribute to users quickly learning to use new 360-3D games. The games are also designed for minimum set-up and start-up time.

The virtual player 210 might have a weapon that can inflict a specified level of harm on a character 260. The level of harm that a weapon is capable of inflicting can be referred to as the power of the weapon. The amount of harm sustained by a character 260 can be referred to as the damage. For example, a weapon with a power of five can cause five points of damage to a character 260 when the virtual player 210 hits the character 260 with a shot from the weapon. The characters 260 might have specified levels of damage that they can withstand before dying or before some other action occurs to the character 260. For example, a character 260 might die after receiving twenty points of damage. Such a character 260 would die after being shot four times by a weapon with a power of five.

Similarly, the characters 260 might have weapons capable of inflicting specified levels of damage on the virtual player 210 and the virtual player 210 might have a specified level of damage he can withstand before being killed. Typically, a game might be won or a new level of the game might be reached if the virtual player 210 kills all the characters 260 before the characters 260 kill the virtual player 210. Numerous variations on this general gaming concept are possible and will be evident to one of skill in the art. The concept of power and damage, for example, are readily extended to games not directed to combat, for example a fire fighting game.

When a 360-3D game is started, various characters 260 performing various actions can appear in various locations in the scene. The manner in which a game developer uses the authoring tool 130 to specify which characters 260 will appear, what their characteristics are, where they will appear, and what they will be doing will be described in detail below.

At the start of a game, the virtual player 210 can begin turning, setting the position of the crosshairs 270, and shooting in the manner described above. The characters 260 can also begin shooting at the virtual player 210. In an embodiment, a monitoring routine might be used to determine when the virtual player 210 begins shooting at the start of a game, and the characters 260 might not be allowed to begin shooting until the virtual player 210 begins shooting. In this way, the virtual player 210 might be given an opportunity to safely survey the scene at the beginning of a game. This can also give new players an opportunity to learn the game.

The behavior of a character 260 is specified or described by a game developer in one or more .act files 150, which will be described in detail below. As an example, a character 260 might hide behind an object for a specified length of time, rise up from behind the object, shoot at the virtual player 210, then return to hiding. The character 260 might repeat this behavior until he is killed by the virtual player 210.

This behavior might be stored as a single .act file 150. It should be reiterated that .act files 150 contain only data and no executable code. A first portion of the .act file 150 might contain data related to settings for the characteristics of the character 260, such as the amount of damage the character 260 can withstand before dying and the actions that are to be taken if the character 260 dies. A second portion of the .act file 150 might contain instructions for depicting the character 260 rising up. A third portion of the .act file 150 might contain instructions for depicting the character 260 shooting at the virtual player. A fourth portion of the .act file 150 might contain instructions for the length of time the character 260 should remain in hiding. A fifth portion of the .act file 150 might contain an instruction to return to the second portion so that the sequence of events is repeated. In some embodiments, all the information for these activities may be kept in a single .act file 150 having separate portions, or these activities may be maintained in separate .act files 150.

If the virtual player 210 kills the character 260, the settings in the first portion of the .act file 150 might be consulted. These settings might identify one or more other .act files 150 to be called on the death of the character 260, and these other .act files 150 might cause one or more other characters 260 to appear and perform other sequences of actions. A game developer can make the .act files 150 as complicated as desired in order to describe complicated behaviors of the characters 260. The developer can also define multiple .act files 150 for initialization at the beginning of a game to create a beginning scenario that is as complicated as desired.

In addition, an .act file 150 can direct the engine 190 to launch or call as many other .act files 150 as desired at any time. One .act file 150 may direct the engine 190 to launch other .act files 150 when specified actions occur to a character 260. For example, if a first character 260 is killed, a second character 260 may be spawned in one location of the scene and a third character 260 may be spawned in another location. The behaviors of the second character 260 and the third character 260 would be described by other .act files 150. These other .act files 150 might describe complicated sequences of actions for the second character 260 and the third character 260 and might identify other .act files 150 that the engine 190 is to launch when specified actions occur to the second character 260 or the third character 260.

A character's .act file 150 may direct the engine 190 to call different .act files 150 under different circumstances. For example, if a character 260 is wounded, the engine 190 may be directed, as by the .act file 150 that describes the behavior of the character 260 before it is wounded, to call a different .act file 150 that describes limping behavior for the character 260. If a character 260 is killed, the engine 190 may be directed to call another .act file 150 that describes dying behavior of the character 260. If the character 260 moves to a specified location, an .act file 150 may direct the engine 190 to change the power of the weapon of the character 260 or the amount of damage the character 260 can withstand. Other ways in which the behavior of a character 260 might change based on the circumstances of a game will be evident to one of skill in the art.

In this way, .act files 150 can direct the engine 190 to launch or to call other .act files 150 throughout the progression of the game. Complicated game plots can be generated on the fly simply by the manner in which the virtual player 210 interacts with the characters 260, the manner in which the actions of the characters 260 are controlled by their .act files 150, and the manner in which new characters 260 are spawned based on the data in the .act files 150 that are associated with old characters 260. There would typically be .act files 150 that cause the game to end or cause a new game level to be entered when certain actions occur to certain characters 260 or when a certain score 290 is achieved.

As mentioned previously, when the engine 190 reads the data contained in act files 150, the engine 190 generates sequences of instructions that cause the images in .pic files 140 to be displayed on the screen 200 or cause other types of actions to occur. A sequence of instructions can be referred to as an action definition. It should be appreciated that the .act files 150 contain only data and no instructions or code operable for processing. More specifically, the .act files 150 do not contain machine instructions suitable for loading into an instruction register for execution by a processor unit, for example a central processor unit (CPU) or a digital signal processor (DSP). Any references herein to the .act file 150 instructing, directing, or engaging in processing functionality are intended to refer to the processing accomplished by the engine 190, which reads the .act file 150 and processes instructions to execute the game. An .act file 150 can be thought of as a series of frames, where each frame holds one command that is to be carried out when read by the runtime engine 190. A frame might also hold other types of instructions.

In an embodiment, each frame of an .act file 150 consists of 32 bytes of data. In other embodiments, the frames could be of other sizes. One byte can contain an indicator that describes or specifies the command that is to be carried out by the engine 190. Other bytes can contain the name and/or location of a file that the command applies to, for example a specific .pic file that is to be displayed as an image in the scene. In an embodiment the file may be identified by an address offset into the container 160. In addition to the commands, other types of instructions can be placed in the other bytes. A game developer, using the authoring tool 130 as described below, can specify the command indicators, file names, and other instructions that each frame is to hold, thus specifying the action that will occur when each frame is read by the runtime engine 190.

When the runtime engine 190 executes an .act file 150, the runtime engine 190 may be said to launch an activity. An activity may also be referred to as an action. An activity or action may be thought of as an instance of an .act file 150. For example, three running soldiers may be created on the scene by launching a single .act file 150 that defines a running soldier animation, three times. Each individual running soldier is a distinct and unique activity. An activity contains information identifying the .act file 150 that describes the behavior of the activity, the current frame of the activity, the accumulated damage sustained by the activity, the present location in the scene of the activity, and other state information. It will be appreciated by one skilled in the art that three activities, for example, defining the state of an instance of a running soldier launched from a common .act file 150 may be distinguished based on how much damage each separate activity has sustained, when each activity was launched and hence how far the character associated with the activity may have moved from the initial launch position, etc. In an embodiment, the runtime engine 190 allocates an execution track to each activity and can process multiple execution tracks during a time tick or clock tick.

Figure 5:
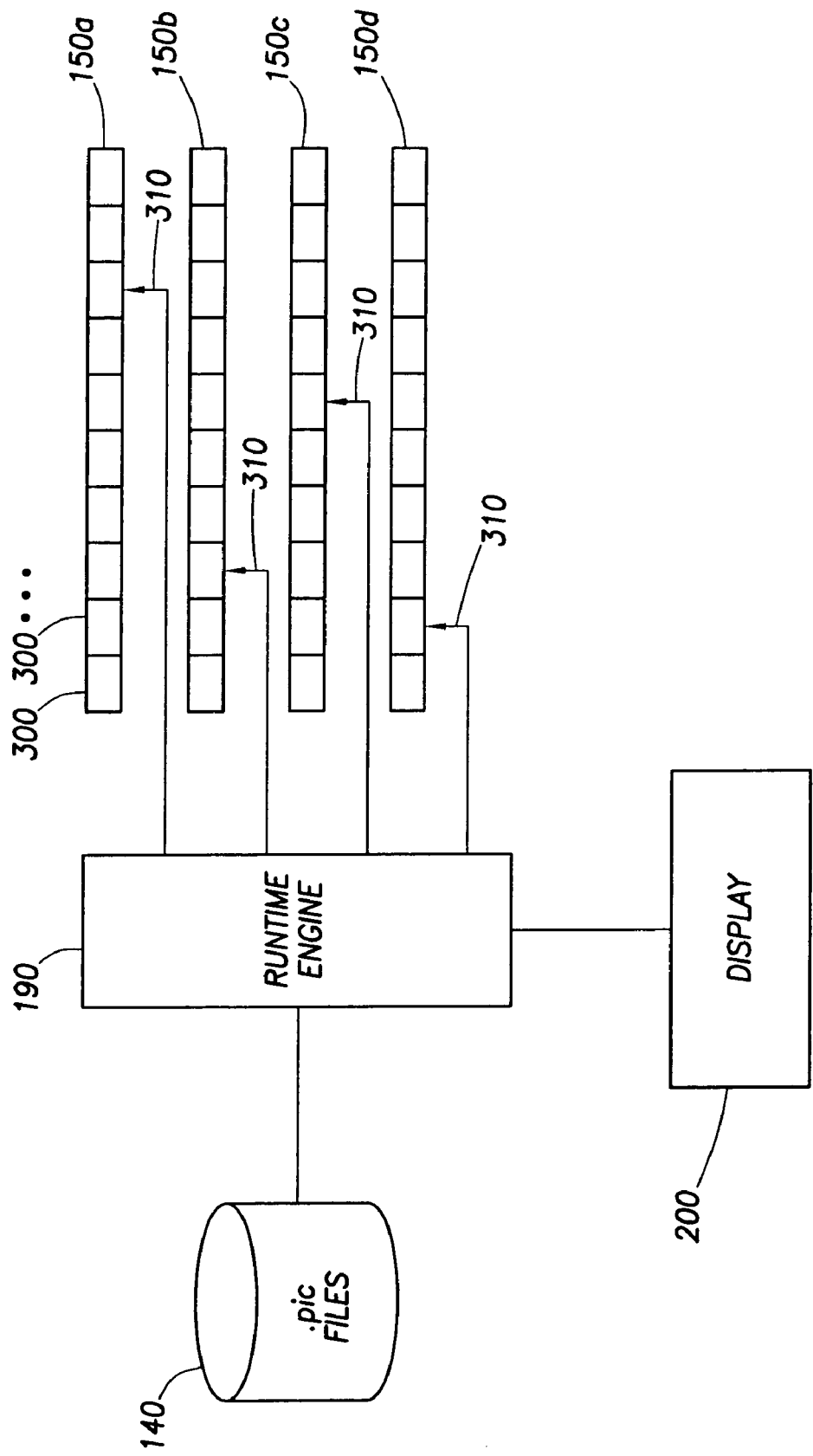
FIG. 5 illustrates a runtime engine processing files that might be used in a game according to an embodiment of the present disclosure.

The runtime engine 190 executes the instructions in multiple .act files 150 during a small portion of time that may be referred to as a time slice or a clock tick or a tick. FIG. 5 illustrates the runtime engine 190 reading frames 300 in a set of four .act files 150. In other embodiments, other numbers of .act files 150 could be present. The .act files 150 are shown as the same size but that does not necessarily have to be the case. The arrows 310 indicate the frame 300 that the engine 190 is currently reading. In this example, it can be seen that the engine 190 is reading a different frame 300 in each .act file 150. When the engine 190 reads multiple .act files 150 during the same tick, it can cause multiple images to appear on the display 200 simultaneously.

One of the commands that might be present in a frame is the '.pic' command. If a frame contains a '.pic' command, the runtime engine 190 retrieves the appropriate pic file 140 and displays the image contained in the .pic file 140 on the display 200. The images in .pic files 140 will be described in more detail below.

As an example of the use of the '.pic' command, an .act 150 might be created to give the appearance that a character 260 is running. It may be known, for example, that about fourteen different running poses, each depicting a slightly different body position, need to be displayed sequentially to create a realistic looking running motion. Each of the poses might be stored in a separate .pic file 140. One frame in the .act 150 might contain a '.pic' command calling for the retrieval and display of the first running pose, the next frame might contain a '.pic' command calling for the retrieval and display of the second running pose, and so on. Another frame might specify that the previous fourteen frames are to be repeated. When the fourteen images are sequentially displayed on a video screen in a loop, the running motion is created.

It is known that smooth, realistic depictions of motion on a video screen require that moving images on the screen be updated at about fifteen or more times per second. Theater films commonly update screen images twenty-four times per second, and television commonly updates screen images thirty times per second. Therefore, the runtime engine 190 executes the commands in an .act file 150 at a rate of about fifteen or more commands or sets of instructions per second, or at least one command approximately every 67 milliseconds. This 67 millisecond time period can be referred to as a time slice, a clock tick, or a tick. For the most part, there is a one-to-one relationship between ticks and frames. That is, one frame is read from each of the active .act files 150 every tick. However, in some instances, such as when an instruction option known as a 'multi' is present in a frame, more than one frame can be read in a single tick. The 'multi' instruction option will be discussed in detail below. It will be appreciated that the above-described frames display rate, tick processing rate, and rate of reading the frames of the .act files 150 are provided in the embodiment currently described, but that other rates may be used in other embodiments.

A distinction may need to be made between two different uses of the word 'frame' as used herein. In common parlance, films are said to be displayed at a certain number of frames per second, meaning the number of images that are displayed per second. With this usage, a 360-3D game may be said to be displayed at about fifteen frames per second. The word 'frame' might also refer to the packet of data or portion of an .act file 150 referred to herein as a 'frame' of an .act file.

In an embodiment, besides the '.pic' command, the following commands can occur in a frame of an .act 150: 'launch', 'go to', 'if .act go to self', 'damage', 'delete', 'delete self', 'reload', 'bonus', 'sound', 'sound stop', 'shoot', 'say', and 'hear'. The 'launch' command causes an instance of an .act 150*b* to begin execution while the current .act 150*a* continues execution. For example, multiple instances of a running soldier may be launched based on a single .act 150 describing the sequence of .pic commands needed to describe animation of a running figure. Each instance of an .act 150 that is executing may be referred to as an activity. The term activity may also refer to the reading of the frames of an .act 150 by the engine 190.

The 'launch' command spawns an activity defined by the .act file 150 identified in the launch command. The launch command can be used to permit one character 260 to cause another character 260 to be generated. For example, if a first character 260 is killed, a second character 260 might be spawned, as for example a reinforcement sent to replace a casualty. This could be accomplished by placing a 'launch' command in a frame of the .act 150*a* related to the first character 260 that launches the .act 150*b* related to the second character 260. It may be desired to have the corpse of the first character 260 remain visible while the second character 260 is active. The 'launch' command would allow the .act 150*a* related to the first character 260 to remain active and display the corpse while also causing the .act 150*b* related to the second character 260 to begin execution. One of skill in the art will recognize other ways in which the 'launch' command could be used to control the action in a 360-3D game.

The 'go to' command is similar to the 'launch' command in that a 'go to' command in a first activity defined by a first .act 150*a* can cause a second activity defined by a second .act 150*b* to begin execution. However, unlike the 'launch' command', the 'go to' command in the first activity causes the first activity to cease execution and to be deleted. In the example above, a 'go to' command might be used if it is not desired to have the corpse of the first character 260 remain visible after the first character 260 is killed. If the 'go to' command is used to spawn the second character 260 when the first character 260 is killed, the activity defined by the .act 150*a* and related to the first character 260 would cease operation and the first character 260 would disappear by not being displayed on the next tick.

The 'go to' command can also provide the looping capabilities described above in the example of a character running. In this case, the 'go to' command is used to cause an .act 150 to go to itself. When the 'go to' command is used, it is possible to specify which frame in the .act 150 is the target of the 'go to' command. For reasons discussed below, it may not be desirable for the first frame of an .act 150 to be the target of the 'go to' command. Thus, when a 'go to' command is used to create a loop within an .act 150, the 'go to' command typically resets the execution of the .act 150 to the second frame of the .act 150. Such a command would cause execution of the .act 150 to cease at the point where the 'go to' command is located and return to the second frame of that .act 150. The second frame through the last frame of the .act 150 would thus be executed repeatedly. Other ways in which 360-3D game developers may use the 'go to' command to describe other behaviors of characters 260 will be evident to one of skill in the art.

The 'if .act go to self' command is a powerful command that provides 360-3D game developers a great deal of capacity to describe the behavior of characters 260. With this command, a first .act 150*a* can determine whether a second .act 150*b* is currently active. If the second .act 150*b* is active, the execution of the first .act 150*a* moves to a different frame within the first .act 150*a* or takes other actions. This can allow the character 260 controlled by the first .act 150*a* to perform different actions depending on whether the second .act 150*b* is executing or to provide additional gaming functionality.

For example, it may be desired to have the character 260 controlled by the first .act 150*a* move from left to right across the screen 200 in a first layer if a particular object is not present in the first layer. If the object is present in the first layer, it may be desired to have the character 260 move in a second layer. To accomplish this, the .act 150*a* that controls the character 260 may contain a first set of instructions that cause the character 260 to appear to move in the first layer and a second set of instructions that cause the character 260 to appear to move in the second layer. The .act 150*a* may also contain an 'if .act go to self' command that checks whether the object is present.

The character 260 may start out moving in the first layer and the .act 150*a* controlling the character 260 may periodically execute the 'if .act go to self' command to determine if the object is present. If the object is not present (that is, if the .act 150*b* controlling the object is not currently active), the .act 150*a* controlling the character 260 may continue executing the first set of instructions and remain in the first layer. If the object is present, (that is, if the .act 150*b* controlling the object is currently active) the .act 150*a* controlling the character 260 may jump to the second set of instructions and thus cause the character 260 to appear to move to the second layer. This might cause the character 260 to appear to move behind the object. One of skill in the art will be able to find numerous other ways in which the 'if .act go to self' command can be used to organize the programming logic of a 360-3D game.

The 'damage' command is used to specify the amount of damage a character 260 can sustain before the character 260 is killed or some other action occurs to the character 260. The 'damage' command also specifies the action that will occur when the damage threshold for the character 260 is reached. For example, if a 'damage' command in a first .act 150*a* is given a damage level of twenty and is associated with a second .act 150*b* called 'die1', when the character 260 controlled by the first .act 150*a* sustains a damage of twenty, the 'die1' .act 150*b* will begin execution. The 'die1' .act 150*b* might depict the character 260 falling to the ground.

The 'damage' command is typically placed in the first frame of an .act 150*a*. The damage threshold specified in that frame and the name of .act file 150*b* to be launched when that threshold is reached remain in effect throughout the execution of the .act 150*a* unless modified by a subsequent 'damage' command. Changing the .act 150 to be executed when the damage threshold is reached can cause a character 260 to die in different manners under different circumstances. For example, a character 260 on the ground may have a 'die1' .act 150*b* that causes the character 260 to appear to fall to the ground in one manner upon dying. If the character 260 subsequently moves to an elevated location, the 'damage' command may be invoked to change the manner in which the character 260 dies. A 'die2' .act 150*c* may be specified by the 'damage' command so that the character 260 appears to fall to the ground in a different manner upon dying.

The 'delete' command causes all activities controlled by an .act 150 with a specified name to cease execution and thus causes the characters 260 controlled by the subject .act 150 to disappear from the screen 200. For example, a character 260 running from left to right across the screen 200 might be controlled by an .act file 150 called 'run3'. Multiple instances of such running characters 260, or running activities, may be spawned from the 'run3' .act file 150. A 'delete' command applied to the file name 'run3' might cause all of the running characters 260, or running activities, spawned from the 'run3' .act file 150 to cease execution simultaneously and cause all the instances of the character 260, or running activities, to disappear simultaneously.

By contrast, the 'delete self' command would cause only the activity whose 'delete self' command is executed to cease execution. For example, a 'delete self' command within the 'run2' .act file 150 may not be encountered by the engine 190 when processing a first activity spawned by the 'run2' .act file 150 because the first activity is looping. The engine 190 may encounter the 'delete self' command, however, when processing a second activity spawned by the 'run2' .act file 150 because a different event may be applied to the second activity, for example a shot fired by the virtual player 210, causing processing of the second activity to depart from the loop and proceed further to process the 'delete self' command. In this case, the character 260 associated with the second activity spawned by the 'run2' .act file 150 would disappear but the character 260 associated with the first activity spawned by the 'run2' .act file 150 would continue to be seen.

The 'reload' command causes a change in the amount of ammunition available to the virtual player 210. The virtual player 210 typically begins a game with a fixed amount of ammunition. Each shot taken by the virtual player 210 decreases this amount by the power of the weapon the virtual player 210 is using. For example, if the virtual player 210 begins a game with an ammunition level of 100 and if the weapon used by the virtual player 210 has a power of five, the virtual player 210 could take twenty shots before running out of ammunition. The 'reload' command can either increase or decrease the virtual player's ammunition level. For example, if the virtual player 210 wins one level of a game and moves to another level, the 'reload' command might be invoked to reset the virtual player's ammunition level to its maximum value. Alternatively, if the virtual player 210 shoots an innocent character 260 rather than an enemy, the 'reload' command might be invoked to deduct ammunition from the virtual player 210. The 'reload' command may be used to increase or decrease any store that pertains to playing the subject game.

The 'bonus' command allows the virtual player 210 to be given additional points in some circumstances. Normally, the number of points the virtual player 210 receives is equal to the damage required to kill a character 260. That is, if twenty points of damage are required to kill a character 260, the virtual player 210 would receive twenty points for killing the character 260. By inserting a 'bonus' command in a frame of an .act 150, a game developer can allow the virtual player 210 to receive a greater than normal number of points for killing the character 260. Bonus points might also be given when other events occur.

The 'sound' command allows a sound to be played in a frame. The location and name of the file containing the sound can be specified in a frame that contains the 'sound' command. A loop value can be associated with the 'sound' command so that a sound can be repeated a specified number of times. The 'sound stop' command can be used to stop a sound earlier than it would normally stop.

The 'shoot' command is used to give one .act 150 the ability to inflict damage on another .act 150 that is currently playing. As an example, the 'shoot' command might allow the explosion of an object to kill a character 260.

The 'say' command allows an .act 150 to send a message to another .act 150. The 'hear' command gives an .act 150 the ability to listen to messages from other .acts 150.

It will be evident to one of skill in the art that the above commands and variations thereof can provide 360-3D game developers with the ability to describe complicated gaming scenarios. One of skill in the art will also recognize that other names could be used for these commands, additional commands could be used, a smaller set of these commands could be used, combinations of various described functionalities could be used, or other functionalities could be used without departing from the spirit of this disclosure.

To reduce the size of each frame 300 and the resulting .act file 150 size, each frame of an .act 150 contains an indicator that is about one byte in length, that specifies which command is to be carried out in that frame. For example, an indicator of '1' might specify the '.pic' command, an indicator of '2' might specify the 'launch' command, an indicator of '3' might specify the 'go to' command, etc. In other embodiments, other indicators could be used. The indicator also indicates the type of file that is to be associated with the command. That is, it is understood that if a '.pic' command is indicated in a frame, the file pointer or file name in that frame refers to the .pic file 140 that is to be displayed. If a 'launch' command is indicated in a frame, the file pointer or file name in that frame refers to the .act 150 that is to be launched, and so on. It should be appreciated that numerous aspects such as these have been employed to reduce the size of 360-3D games, in terms of storage, memory requirements, and otherwise, to enable the games to run on mobile devices 180 with standard hardware capabilities. It can be seen that each frame may be thought of as a record in the .act data file, where each field in the record includes representative data. For example, the first field might relate to the above command with the data in that field associated with the indicated command.

In addition to the commands, other instructions can be present in a frame. In an embodiment, the additional instructions include 'absolute x', 'absolute y', 'delta x', 'delta y', 'scale', 'layer', 'power', and 'multi'. 'Absolute x' and 'absolute y' specify the pixel numbers of the horizontal and vertical locations, respectively, at which an object is to appear, for example the image defined by a .pic file pointed to or referenced by the frame. The 'absolute x' and 'absolute y' instructions would typically appear only in the first frame of an .act 150 to specify the beginning position of the object. The frame in which the 'absolute x' and 'absolute y' instructions appear would typically not be returned to during the execution of an activity defined by the .act 150 since returning to that frame would cause a character 260 to move from its current location to its start location. This might cause a large, sudden jump that might be undesirable.

The 'delta x' and 'delta y' instructions specify the number of pixels a character 260 is to move horizontally and vertically, respectively, relative to the character's position in the previous frame. In the example above where the ten frames of a running motion created the appearance of a character 260 running, the character 260 would appear to be running in place unless a movement through the scene is specified. To create the appearance of movement, a 'delta x' instruction in each frame can specify the distance the character 260 is to be horizontally displaced relative to the background.

The 'scale' instruction indicates a character's relative size and is typically specified as a percentage of a standard size. Increasing the scale of a character 260 from frame to frame can create the appearance that the character 260 is moving towards the virtual player 210 and decreasing the scale of a character 260 from frame to frame can create the appearance that the character 260 is moving away from the virtual player 210.

The 'layer' instruction specifies the layer, as depicted in FIG. 4, in which an object is to appear. A game developer would typically specify a change in a character's layer as the character 260 appears to move forward or backward through a change in scale.

The 'power' instruction specifies the amount of power possessed by a character's weapon and, consequently, the amount of damage done to the virtual player 210 when the character 260 shoots the virtual player 210. A game developer might set the power of a character's weapon at zero when the character 260 is not shooting but change the power to some other value when the character 260 is shooting. This could be accomplished by using two different .act files 150 to depict the character 260, one showing the character 260 shooting and the other showing the character 260 not shooting. As control of how the character 260 is depicted alternates between the two .act files 150, the 'power' instruction could be invoked to alternate the power between zero and some positive value. While the 'power' instruction is described above with reference to a shooting oriented game, it is understood that the 'power' construct can be generalized to other gaming scenarios.

The 'multi' instruction option, which can be selected or deselected in each frame, allows two or more frames to be read and executed essentially simultaneously. As mentioned previously, one frame from each .act file 150 is normally read during one tick, or every 67 milliseconds. When the 'multi' option is selected in a frame, that frame and the next frame in the same .act file 150 are read and processed during a single tick. This provides a great deal of descriptive power and can be used to ensure that moving images behave as desired, for example by displaying an animation without flicker during a frame when a 'go to' is executed.

For example, in the example of running motion described above, it was stated that fourteen frames of an .act 150 could contain '.pic' commands that cause different poses of a running motion to be displayed and a fifteenth frame could contain a 'go to' command to return to the first running frame. If the 'multi' option is not selected in any of the frames, each of the frames would be read in a different tick. During the execution of the 'go to' command in the fifteenth frame, no image would be displayed and a 67 millisecond flicker would appear on the screen 200 while that frame is read and before the first running frame is read again and processed by the engine 190 for display.

This flicker can be prevented by selecting the 'multi' instruction option in the fourteenth frame. The 'multi' instruction would indicate that the fourteenth frame and the fifteenth frame are to be read and processed during the same tick. That is, the '.pic' command that causes the fourteenth running pose to be displayed and the 'go to' command that causes the .act 150 to return to the first running frame are processed in the same tick. The first running frame may then be executed in the next tick or 67 millisecond time period.

A single 'multi' instruction causes the current frame and only the immediately subsequent frame to be executed in the same tick. However, 'multi' instruction options can be selected in as many consecutive frames as desired in order to have as many frames as desired executed in the same tick. For example, if it is desired to simultaneously return to the beginning of a loop in the current .act 150*a*, launch another .act 150*b*, and change the damage needed to kill a character 260, while displaying the image of the character 260, multiple consecutive frames with 'multi' instructions could be used. A first frame could have a '.pic' command and a 'multi' instruction, a second frame could have a 'go to' command and a 'multi' instruction, a third frame could have a 'launch' command and a 'multi' instruction, and a fourth frame could have a 'damage' command. The 'multi' instruction in the first frame would cause the second frame to be executed in the same tick as the first frame, the 'multi' instruction in the second frame would cause the third frame to be executed in the same tick as the second frame, and the 'multi' instruction in the third frame would cause the fourth frame to be executed in the same tick as the third frame. Thus, all four frames would be executed in the same tick. One of skill in the art would be able to determine other ways in which the 'multi' option could be used to control the flow of a 360-3D game.

The first frame of an .act 150, which might be referred to as frame 0, may be advantageously used to specify the settings that will remain in effect until they are changed in a later frame of the .act 150. For example, the 'damage' command may be placed in frame 0 to establish the amount of damage that will be needed to kill a character 260. Frame 0 may also contain instructions for absolute x, absolute y, layer, and scale to establish the initial position and size of the character 260. As mentioned above, frame 0 may not be listed as the target of a 'go to' command since going to frame 0 might cause a character 260 to suddenly jump from one location to another, in the case that an absolute x and/or an absolute y position have been defined in frame 0.

Figure 6A:
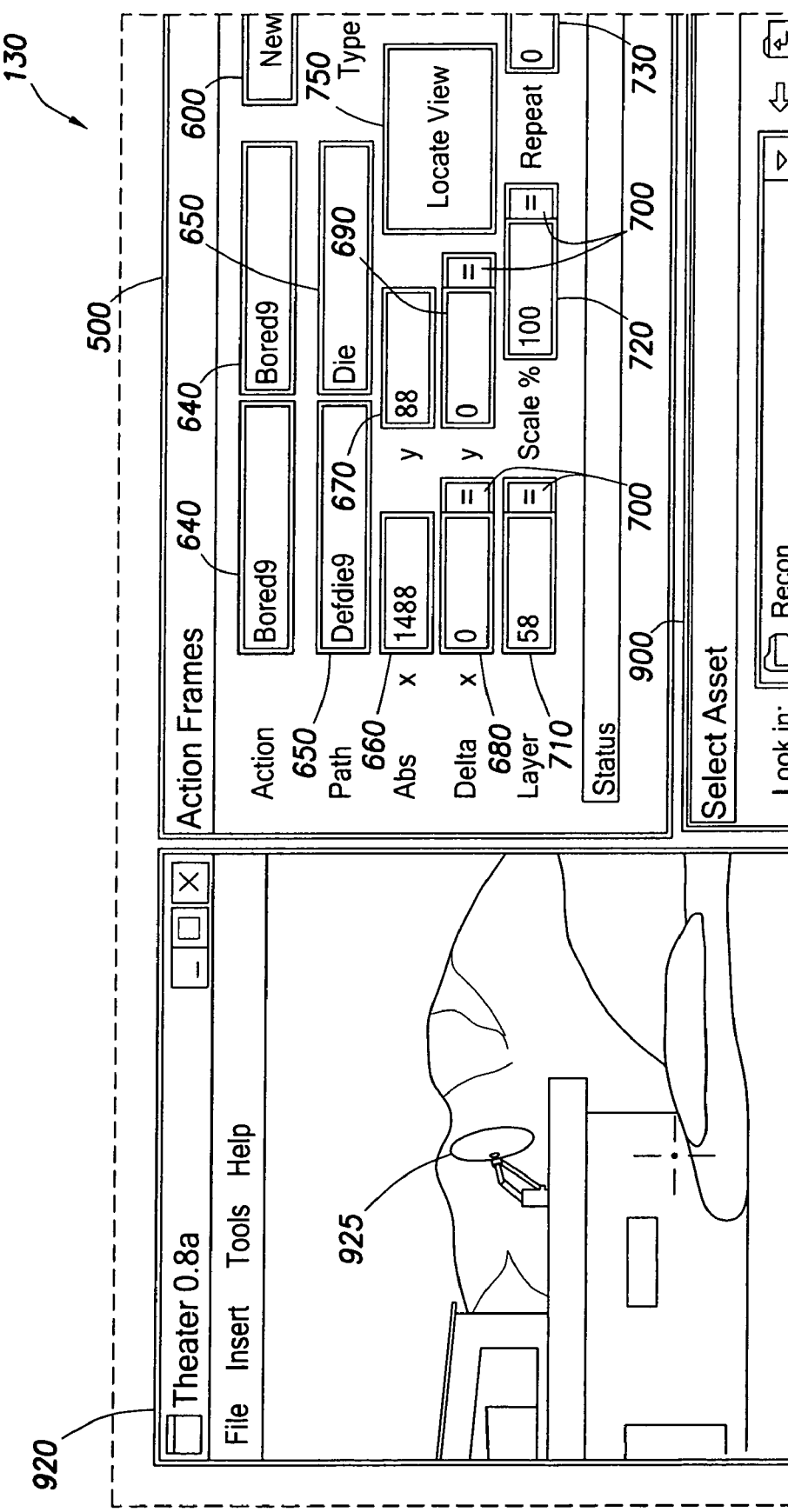
Figure 6B:
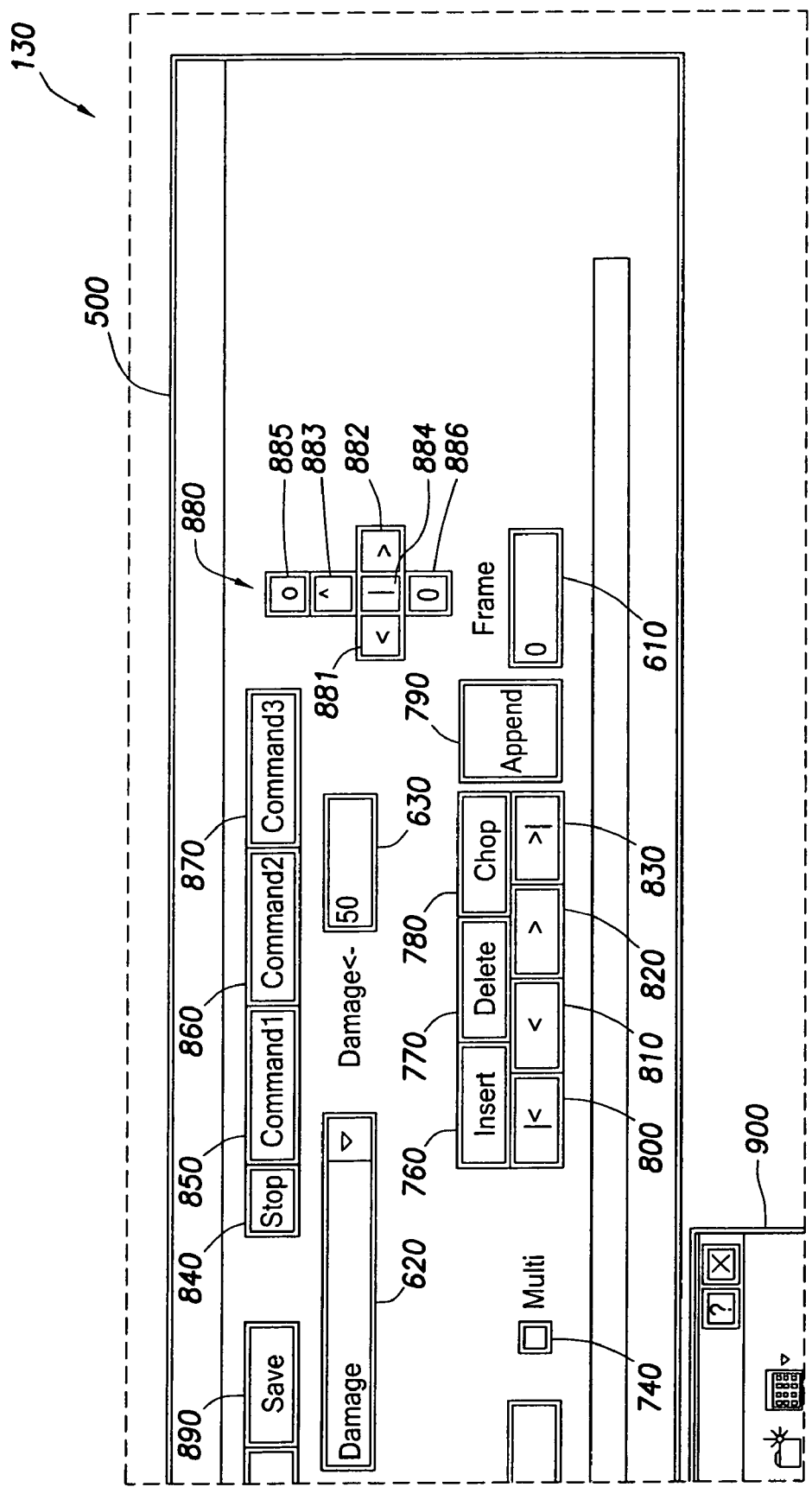
Figure 6C:
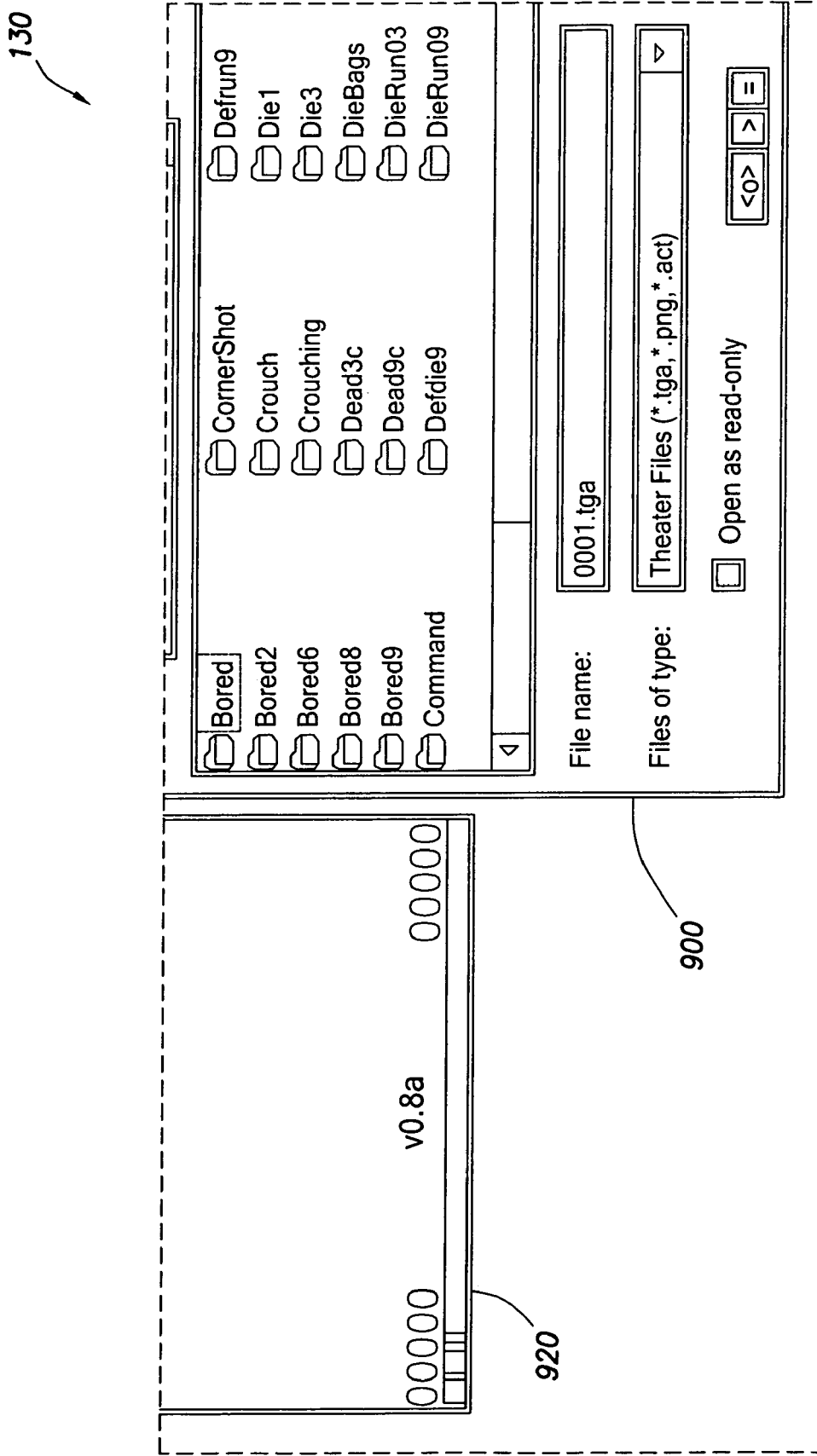

The data that makes up the 32 bytes in a frame of an .act 150 can easily be specified by means of an authoring tool 130. FIG. 6 illustrates an embodiment of a computer-implemented authoring tool 130. Generally, the authoring tool 130 is operable to efficiently create a 360-3D game. While a specific embodiment of the tool 130 is described below, it is intended that this disclosure applies to other alternative GUI configurations and controls for constructing a 360-3D game for execution on the engine 190.

The tool 130 includes a graphical user interface (GUI) 500 for specifying the commands and other instructions that will be inserted into a frame, a file selection box 900 for identifying the file that will be retrieved by a frame, and an emulator 920 for viewing the effects of selections made in the GUI 500 and the file selection box 900. The emulator 920 simulates the display 200 that will appear on a mobile device 180 when a 360-3D game is played.

The GUI 500 contains buttons, text boxes, check boxes, and other data input mechanisms that allow a 360-3D game developer to specify the commands and other instructions that will be included in a frame. The data that is entered into one instance of the GUI 500 is saved as one frame of an .act 150. A developer can build an .act 150 frame by frame by entering data into a different instance of the GUI 500 for each frame.

To begin creating a new .act 150, the developer would typically click on a button 600 entitled 'New'. The developer could then enter data for the first frame of the .act 150, typically frame 0. The frame to which the information entered into the GUI 500 applies can be specified in a text box 610 entitled 'Frame'. After entering data for a frame, the developer can change the frame number in the frame text box 610 and begin entering data for the next frame. This process can continue until all of the frames for the current .act 150 have been created. The developer could then click on the 'Save' button 890 to save the .act 150.

A drop down box 620 entitled 'Type' is used to specify the command that will be executed in a frame. In an embodiment, the commands are '.pic', 'launch', 'go to', 'if .act go to self', 'damage', 'delete', 'delete self', 'reload', and 'bonus', as discussed above, but in other embodiments other commands could be used. In the present embodiment, only one command is entered into each frame. The drop down box 620 lists all possible commands that could apply to a frame and the developer can select a desired command with a mouse click on an item in the list.

The data input mechanisms that appear in the GUI 500 can change depending on the command that is selected in the command drop down box 620, making the GUI 500 a context sensitive GUI. In the embodiment of FIG. 6, the 'damage' command has been selected and this causes a text box 630 entitled 'Damage' to appear. The damage text box 630 allows the developer to specify the damage that will apply to the current frame. If another command had been selected in the command drop down box 620, other text boxes might appear in the place of the damage text box 630. For example, if the '.pic' command had been selected, a text box might appear that would allow the developer to specify the power that will apply to the character 260 depicted by a specified .pic file 140. If the 'go to' command had been selected, a text box might appear that would allow the developer to specify the frame number that should be read and executed next.

Text boxes 640 entitled 'Action' allow a developer to specify any .acts 150 that the current frame will cause to begin execution. In the embodiment of FIG. 6, the 'damage' command has been selected in the command drop down box 620, so an .act 150 listed in an action text box 640 specifies the .act 150 that will begin executing when the current character 260 reaches the specified damage threshold. For example, an action text box 640 might list an .act 150 that depicts a character 260 dying. If the 'launch' command or the 'go to' command had been selected in the command drop down box 620, an .act 150 listed in an action text box 640 would specify the .act 150b that would begin executing when the current frame in the current .act 150a is reached.

Data might be entered into the action text boxes 640 manually. Alternatively, the file selection box 900 could be used to select an .act 150 to enter into an action text box 640. That is, a developer could browse through the file selection box 900 until a desired .act file 150 is found. The select button 910 in the file selection box 900 could then be clicked to automatically insert the selected .act file 150 into an action text box 640.

Text boxes 650 entitled 'Path' specify the directory path under which the .act files 150 listed in the action text boxes 640 can be found. Data might be entered into the path text boxes 650 manually or the path data might be automatically entered based on the location of the .act file 150 selected by the developer in the file selection box 900.

The action text boxes 640 and the path text boxes 650 might appear only when certain commands, such as 'damage', are selected in the command drop down box 620. This behavior may be referred to by describing the GUI 500 as a context sensitive GUI. When other commands are selected, other text boxes might appear in the positions where the action text boxes 640 and the path text boxes 650 are located in FIG. 6. For example, if the '.pic' command had been selected in the command drop down box 620, text boxes might appear in the positions of the action text boxes 640 and the path text boxes 650 that pertain to the .pic file 140 that is to be retrieved by the current frame.

A text box 660 entitled 'Abs x' and a text box 670 entitled 'Abs y' allow a developer to specify the absolute horizontal and absolute vertical pixel locations at which a character 260 is to appear on a display 200, which may be relative to the coordinates of the 360-degree background landscape image. The absolute x and absolute y positions could be entered manually or, alternatively, the file selection box 900 and the emulator 920 could be used to set the absolute x and absolute y positions. For example, a developer could browse through the file selection box 900 until a desired .pic file 140 is found. When the developer selects the .pic file 140, the image of the character 260 in the .pic file 140 appears in the emulator 920. The absolute x and y positions of the image appear in the Abs x text box 660 and the Abs y text box 670. The developer can move the image in the emulator 920 until the image is in a desired location. This location can then be set as the location at which the character 260 should first appear.

The Abs x text box 660 and the Abs y text box 670 can also be used to set the positions of non-moving objects, such as the satellite dish 925 shown in the emulator 920. Non-moving objects such as this can be given the capability to be destroyed by shots from the virtual player 210.

As mentioned above, the absolute x and y positions of an image would typically be specified only in frame 0 of an .act 150. Thereafter, a delta x instruction and a delta y instruction would be used to specify the number of pixels the image should move in the current frame relative to the previous frame. The delta x value can be specified in a text box 680 and the delta y value can be specified in a text box 690. The delta x and delta y values could be entered manually for each frame of an .act 150. Alternatively, a shortcut is available in the GUI 500 to make entry of the delta x and delta y values easier. Duplicator buttons 700 are located near the delta x text box 680 and the delta y text box 690. When a duplicator button 700 is selected, the value in the delta x text box 680 or delta y text box 690 with which the duplicator button 700 is associated will be automatically repeated for each frame in the .act 150. In this way, a character 260 can easily be made to move the same distance in every frame of an .act 150.

A text box 710 entitled 'Layer' allows the developer to specify the layer in which a character 260 is to appear in the current frame. A duplicator button 700 is associated with the layer text box 710 to allow the developer to specify that the same layer is to apply to every frame in the .act 150.

The developer can use a text box 720 entitled 'Scale' to specify the relative size a character 260 is to have in the current frame. Scale is typically given as a percentage with 100% being the default value. Another duplicator button 700 is associated with the scale text box 720 to allow the developer to specify that the character 260 is to have the same size in every frame in the .act 150.

In an embodiment, the data in the layer text box 710 and the data in the scale text box 720 can be automatically related to each other so that the appropriate adjustments are automatically made to the layer when the scale is adjusted and vice versa. For example, if the developer decreases the scale of a character 260 by a constant amount from frame to frame to create the appearance of movement toward the background, the layer that the character 260 is in could automatically be changed by a proportional amount from frame to frame so that the character moves into layers that are successively closer to the background.

A text box 730 entitled 'Repeat' provides a shortcut that causes the current frame to be read and executed repeatedly for as many ticks as are specified in the repeat text box 730. This provides an easy way for a non-moving image to appear in the display 200 temporarily. For example, if the developer wanted an object to appear for 10 approximately seconds (approximately 150 ticks), a '.pic' command could be placed in the command drop down box 620, the .pic file 140 that contains the image of the desired object could be placed in an action text box 640, and a value of 150 could be placed in the repeat text box 730.

A check box 740 entitled 'Multi' can be used to specify whether the 'multi' instruction applies to the current frame. If the multi box 740 is checked, the current frame and the next frame will be read and executed in the same tick, as discussed above.

A button 750 entitled 'Locate View' returns the view displayed in the emulator 920 to the scene at which the current .act 150 begins. As the developer uses the authoring tool 130 to work on multiple frames in an .act 150, the view shown in the emulator 920 changes to match the data in the GUI 500 for the current frame. If the developer hits the locate view button 750, the emulator 920 returns to the initial scene specified by the act 150.

An 'Insert' button 760 causes a new frame to be inserted before (or, in an alternative embodiment, after) the frame that is currently being worked on in the GUI 500. A 'Delete' button 770 causes the current frame to be deleted. A 'Chop' button 780 causes all frames in the current .act 150 from the current frame onward to be deleted.

A button 790 entitled 'Append' provides a shortcut for entering similar data into the GUI 500 for several consecutive, closely related frames. Specifically, the append button 790 causes the frame number in the frame text box 610 to be incremented by one and causes the name of the next .pic file 140 in a folder of .pic files 140 to be inserted into an action text box 640. All other information in the GUI 500 remains the same as one frame is incremented to the next frame. This feature is useful, for example, when creating animated motion wherein a sequence of .pic files 140 are used each containing a different stage of a motion animation.

As an example, the append button 790 could be used to facilitate creating an .act 150 depicting a character 260 running, as described above. The .pic files 140 depicting each of the running poses could be arranged in a folder with a first .pic file 140 containing the first running pose listed first, a second .pic file 140 containing the second running pose listed second, and so on. The developer might set the command drop down box 620 to the '.pic' command, set the frame number in the frame text box 610 to 1, and place the name of the first .pic file 140 in an action text box 640. This would cause frame 1 of the current .act 150 to display the image in the first .pic file 140.

If the developer then hit the append button 790, the frame number in the frame text box 610 would change to 2 and the name of the second .pic file 140 would be placed in an action text box 640. The other information that was in the GUI 500 before the append button was hit would remain the same. This would cause frame 2 of the current .act 150 to display the image in the second .pic file 140. The developer could continue to hit the append button 790 until all of the .pic files 140 containing running poses were accounted for. Using the append button 790 can be seen to be more efficient than manually changing the frame number and manually changing the name of the .pic file 140. This can provide a quick and easy way for someone without programming experience to add motion to a game.

A set of buttons 800, 810, 820, and 830 can be used to navigate through the frames in the current .act 150. A first frame button 800 takes the GUI 500 to the first frame of the current .act 150. A previous frame button 810 takes the GUI 500 to the previous frame of the current .act 150. A next frame button 820 takes the GUI 500 to the next frame of the current .act 150. A last frame button 830 takes the GUI 500 to the last frame of the current .act 150.

A button 840 entitled 'Stop' clears all images other than the background image from the emulator 920. Buttons entitled 'Command1' 850, 'Command2' 860, and 'Command3' 870 can be used to set the parameters that will be in effect when a new game is started or when a new level of a game is reached. In the preferred embodiment, a 360-3D game might have three levels of play, where a player can move to the second level only after successfully completing the first level and can move to the third level only after successfully completing the second level. Other embodiments might have a different number of levels. In an embodiment, the .acts 150 that launch the first, second, and third levels can be referred to as command1.act, command2.act, and command3.act, respectively. In an embodiment, the command .acts contain only commands to launch sets of .acts files 150 of actions that occur when a level of a game is begun. Upon selecting the command1 button 850, the developer will be taken to a GUI 500 for entry of data related to the command1.act. Selecting the command2 button 860 or the command3 button 870 will take the developer to a GUI 500 for entry of data related to the command2.act or the command3.act, respectively.

A set of buttons 880 can be used to specify the position and size of a character 260 in the emulator 920. A left button 881 and a right button 882 move a character 260 horizontally through the emulator 920 and an up button 883 and a down button 884 move a character 260 vertically through the emulator 920. Scaling buttons 885 and 886 increase or decrease the size of a character 260. These buttons 880 can be used in place of the Abs x text box 660, the Abs y text box 670, and the scale text box 720 to quickly set a character's initial size and position.

The authoring tool 130 provides for easy importation of a background .bmp file that contains the background panorama and character .tga files into the .pic file 140 format, creation of .act files 150, and other game description operations. The authoring tool 130 would typically be installed on a standard desktop computer 170 and data could be entered into the GUI 500 through the computer's standard keyboard and mouse. Alternatively, a custom keyboard could be used to enter the data. The custom keyboard might have keys that are equivalent to or associated with the buttons and other data input mechanisms in the GUI 500. The keys on the custom keyboard might be color coded as a memory aid for the developer. For example, keys that pertain to .pic-related data might be one color and keys that pertain to frame-related data might be another color. An 'append' key might have both colors because the append function involves both .pic data and frame data. A developer familiar with the authoring tool might find such a custom keyboard faster to use than using a mouse to point and click on controls in the GUI 500.

Since the authoring tool 130 is typically installed on a computer 170, the emulator 920 would typically appear on the video monitor of the computer 170. The video format used by computers is typically different from the format used by mobile devices such as mobile telephones. A conversion process, described in greater detail below, converts the images in a .pic file 140 into a format readable by the video display system of the computer 170. The conversion is the last step that occurs before the data is displayed in the emulator 920 and involves only a modification of the manner in which colors are encoded in the two disparate video display modes. This ensures that a 360-3D game developed through the authoring tool 130 will appear on a mobile device 180 substantially the same as it appeared in the emulator 920.

The authoring tool 130 allows game developers with little or no coding skills to create 360-3D games. Developers can simply select the images that are to appear in a game and then use the authoring tool 130 to create the .act files 150 that will be used by the engine 190 to manipulate the images as desired. Complicated gaming storylines can be created through the use of the commands and other instructions that are placed in each frame of the .act files 150. A single graphic artist with no programming knowledge may be able to create a 360-3D game in a relatively short amount of time. This can be contrasted with traditional ways of developing video games where a staff of coders may be employed to do the programming work and a staff of graphic artists may be employed to do the artistic work. Creating video games in the traditional manner can take a relatively long amount of time and may cost a great deal of money.

The authoring tool 130 supports rapid and easy testing and refinement of 360-3D games. In a typical game development environment involving development of computer software in the form of programming language instructions, a new version of a game may need to be compiled and linked and an executable image transferred to an execution platform before testing game modifications. By contrast, a 360-3D game modification can be immediately tested using the emulation capability of the authoring tool 130. Additionally, 360-3D games can be completely tested using the authoring tool 130 and need never be tested on a target mobile platform or mobile device.

When all of the .act files 150 needed for a 360-3D game have been created, the .pic files 140 and .act files 150 files for the game can be placed in a container 160 and the container 160 can be loaded into a mobile device 180. A runtime engine 190 installed on the mobile device 180 can read the files in the container 160 and execute the commands and other instructions in the .act files 150. For faster, more efficient execution, the runtime engine 190 may be embedded in the operating system of the device 180. That is, in the preferred embodiment, the engine 190 is an extension of the operating system rather than an external application that is independent of the operating system. In other embodiments, the engine 190 may be otherwise located.

The operation of the runtime engine 190 is regulated or coordinated to some extent by the operating system's timing mechanism. As depicted in FIG. 5, the runtime engine 190 can read and execute frames in multiple .act files 150 during the same tick, which may be referred to as executing multiple frames "simultaneously." It is anticipated that slightly different versions of the engine 190 may be created for each operating system into which the engine 190 is to be embedded, but the different versions can be considered to be substantially equivalent.

The engine 190 is the only executable file needed to run a 360-3D game, although in some embodiments the engine 190 may comprise multiple files or components. Once the engine 190 has been embedded in the operating system of a mobile device 180, different games can be installed on the device 180 simply by loading a different container 160, which contains only data files and no executable files or code. The use of a single executable file to run multiple different games can simplify the certification process typically followed when applications are developed for mobile devices 180. Manufacturers of mobile devices 180 require that games and other applications that are to be installed on their devices 180 be tested and/or certified to ensure that the applications do not harbor viruses and will not cause crashes or other problems. For previously existing games, where each game contains executable code, this testing might need to be done for every game and for every platform on which the games are to be installed. For 360-3D games, only the runtime engine 190 needs to be certified and/or tested. Once the engine 190 has been certified for a particular platform, containers 160 can be loaded onto that platform without the threat of viruses, crashes, or other problems, because the containers 160 contain only data, as discussed above.

The separation of 360-3D games into a single executable engine 190 for all games and all mobile devices 180 and multiple containers 160 holding the data files that make each game unique can simplify the game creation process for developers. Developers do not need to write different versions of the same game for different platforms. Any container 160 created through the authoring tool 130 can be read by any device 180 on which the runtime engine 190 has been installed.

The runtime engine 190 is a relatively small file (typically less than about 100 kilobytes) that makes only two graphics function requests to the operating system. First, the engine 190 asks the operating system for the location of the memory block that holds the data for each pixel on the display screen 200 of the mobile device 180. Screens 200 typically use a memory buffer that contains two bytes of data for each pixel. When the engine 190 learns the location of this buffer, it places the appropriate pixel data in the appropriate bytes and then tells the operating system to send this data to the screen 200.

In addition to reading and executing the .act files 150 and performing the graphics functions, the runtime engine 190 performs several other functions. It receives and processes input from the keypad on the mobile device 180 or from other input sources, and it sorts images by layer and displays them in the proper front-to-back order. The engine 190 names and keeps track of the different versions of the different characters 260 that are currently active, and registers and keeps track of successful shots from the virtual player 210 to the characters 260 and from the characters 260 to the virtual player 210. The engine 190 displays the scores 290, operates the radar 280, and receives and processes input from a partner in a multiple player game. (Multi-player games will be described in more detail below.)

Figure 7:
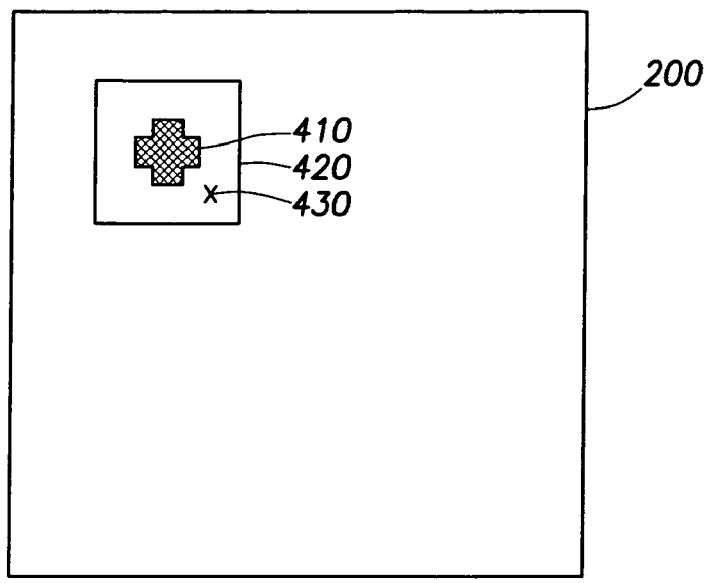
FIG. 7 illustrates a prior art technique for registering successful shots.

The engine 190 registers successful shots from the virtual player 210 to a character 260 in a manner that provides greater precision than previous methods for registering hits. As shown in FIG. 7, an object 410 on the screen 200 of a mobile device 180 is typically rendered as part of a rectangular box 420. The parts of the box 420 that are not occupied by the object 410 are invisible and allow the background to be seen. Previously, if any part of the box 420 was hit by a shot, a hit would be registered on the object 410 regardless of whether or not the object 410 occupied the part of the box 420 that was hit. For example, a shot that struck location X 430 would be registered as a hit on the object 410 since it fell within the box 420 even though it did not fall within the object 410, such as a character 260. Also, if multiple objects 410 were present on the screen 200, the code controlling a game might need to sequentially query all of the objects 410 to determine which one occupied the box 420 that was hit, which is inefficient and time consuming.

Figure 8B:
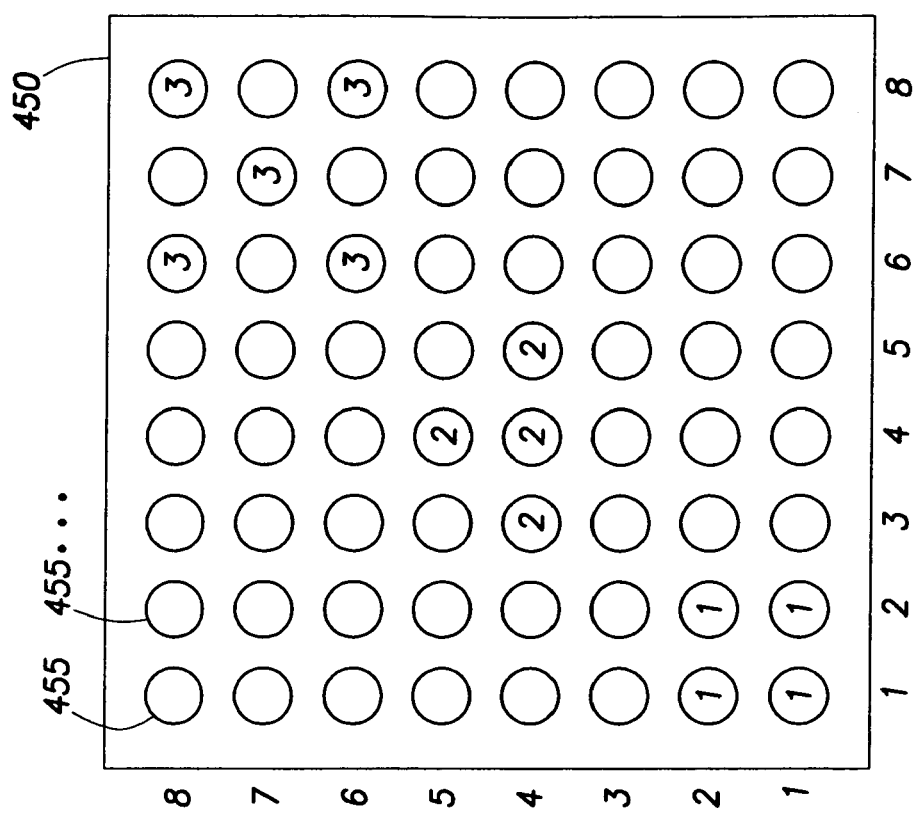
FIG. 8a and 8b illustrate a technique for registering successful shots according to an embodiment of the present disclosure.
Figure 8A:
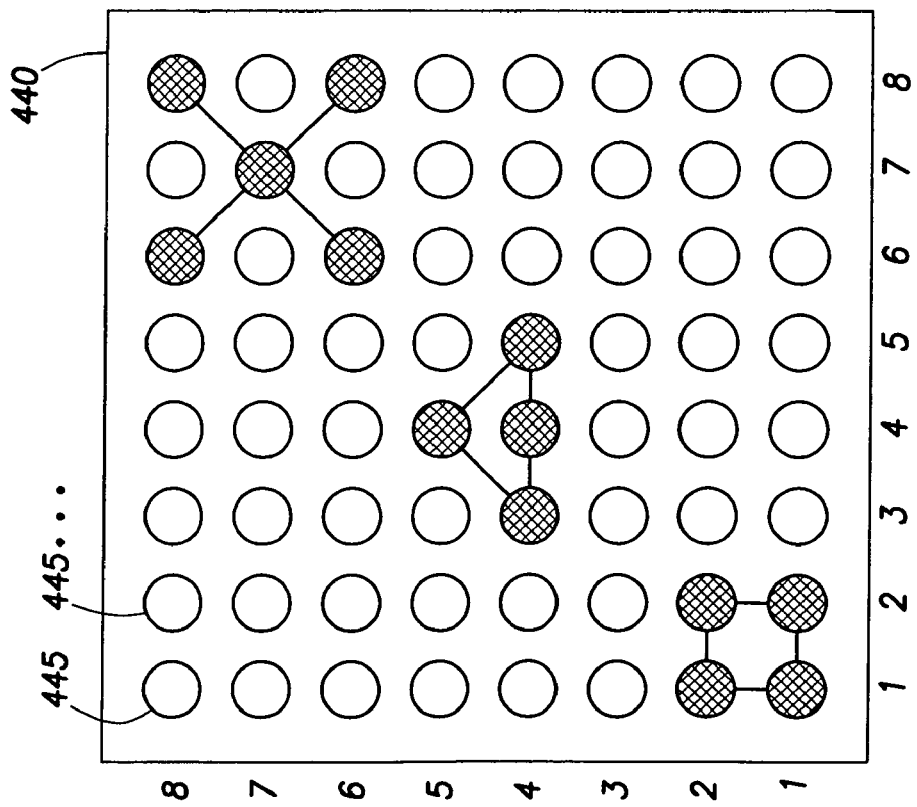

FIG. 8 illustrates an example of the manner in which hits are registered in a 360-3D game. In FIG. 8a, three objects occupy a video display screen 440, such as of the mobile device 180, that has a length of eight pixels 445 and a width of eight pixels 445. A square-shaped object occupies pixels (1,1), (1,2), (2,1), and (2,2). A triangle-shaped object occupies pixels (4,3), (4,4), (4,5), and (5,4). An X-shaped object occupies pixels (6,6), (6,8), (7,7), (8,6), and (8,8). Other pixels 445 on the screen 440 can be considered part of the background image.

In an embodiment, a memory buffer contains data related to each pixel 445 in the actual screen 440. The memory buffer can be viewed as a silhouette screen 450 as shown in FIG. 8b, where each data location 455 in the silhouette screen 450 corresponds to a pixel 445 in the actual screen 440. That is, since the actual screen 440 has eight rows and eight columns of pixels 445, the silhouette screen 450 can be thought of as having eight rows and eight columns of data locations 455.

Whenever an object occupies a set of pixels 445 in the actual screen 440, information about the object's identity is stored in the corresponding data locations 455 in the silhouette screen 450. In an embodiment, the object may be an activity, for example one instance of possibly multiple instances of a running soldier that were all launched from a common .act file 150. For example, if the square-shaped object is identified as object number '1', a '1' might be stored in data locations (1,1), (1,2), (2,1), and (2,2) of the silhouette screen 450. If the triangle-shaped object is identified as object number '2', a '2' might be stored in data locations (4,3), (4,4), (4,5), and (5,4) of the silhouette screen 450. If the X-shaped object is identified as object number '3', a '3' might be stored in data locations (6,6), (6,8), (7,7), (8,6), and (8,8) of the silhouette screen 450. A '0' might be placed in all other data locations 455 in the silhouette screen 450 to indicate the presence of the background image in the actual screen 440. As objects move in the actual screen 440, the silhouette screen 450 changes in a corresponding manner. Only objects that are in the actual screen 440 may be part of the silhouette screen 450.

If a shot is fired at the actual screen 440, the runtime engine 190 records the pixel 445 in the actual screen 440 at which the crosshairs 270 were pointed at the instant the shot was fired. The engine 190 then examines the data in the data location 455 that corresponds to the pixel 445 that was hit to determine which object, if any, currently occupies that pixel 445. If a '0', the background, is present in the data location 455 in the silhouette screen 450 that corresponds to the pixel 445 in the actual screen 440 that was hit, the shot is recorded as a miss or simply results in no change other than decreasing a store. If a nonzero number is present at that data location 455, the engine 190 records the shot as a hit to the object identified by the data in the data location 455.

Continuing the example above, if the crosshairs 270 were pointed at pixel (4,4) in the actual screen 440 at the moment the virtual player 210 fired a shot, a shot at pixel (4,4) would be recorded. The engine 190 would read the data at data location (4,4) in the silhouette screen 450, find a '2', and register the shot as a hit on object number '2', the triangle-shaped object. If pixel (5,5) in the actual screen 440 were hit, for example, the shot would be registered as a miss since a nonzero number does not occupy the data location (5,5) that corresponds to the pixel (5,5).

This manner of registering hits offers greater precision than previously existing methods since hits are determined by the actual size and shape of an object rather than the size and shape of a box that the object occupies. For example, the X-shaped object in FIG. 8a might occupy a box bound by pixels (6,6), (6,7), (6,8), (7,6), (7,7), (7,8), (8,6), (8,7), and (8,8). Under previous methods, a shot that hit pixel (6,7), (7,6), (7,8), or (8,7) would be registered as a hit since those pixels are within the box that the X-shaped object occupies. Under the current method, such shots would not be recorded as hits because those pixels are part of the background image. The current manner of registering hits can also be faster than previous methods since the runtime engine 190 can consult the silhouette screen 450 and almost immediately determine an object that has been hit. Thus, there is no need to query all active objects to determine whether one occupies a pixel that has been hit. Also, by associating the number, such as 1, 2, 3 and so on in the pixel with the related action, the engine 190 can quickly register hits to the appropriate action. Recall that an action is an instance of .act file 150 that the engine 190 is currently executing and that several distinct actions may be launched from a common .act file 150.

The runtime engine 190 is typically pre-complied into the operating system of a mobile device 180 before the device 180 is shipped from its manufacturer. Manufacturers of mobile devices 180 would typically not allow their competitors to have access to the operating systems of their devices 180. For this reason, an enterprise creating a runtime engine 190 would typically be able to embed the engine 190 only in the operating systems of its own devices 180 and not in the operating systems of its competitors. Thus, 360-3D games would typically be executed in the manner described above only on devices 180 manufactured by the entity creating the runtime engine 190. However, there are other ways in which 360-3D games could be executed on competitors' devices 180.

In one embodiment, a version of the runtime engine 190 could be embedded in the Java runtime environment and this modified version of Java could then be installed on competitors' devices 180. Containers 160 holding the .pic files 140 and .act files 150 for a 360-3D game could then be loaded onto the devices 180 in the manner described above and the containers 160 could be read by the Java-based engine 190. Execution of the 360-3D games might be slower under this arrangement since the engine 190 would have to communicate through several layers of software before it could communicate with operating system. However, the other advantages of the 360-3D game development system and method would still be available. That is, the modified version of Java with embedded runtime engine 190 could be certified once each for various operating systems and/or devices 180 and thereafter the containers 160 could be loaded onto the devices 180 without the need for further testing. Also, developers could create 360-3D games in the manner described above without regard for the type of engine 190 that will execute the games.

In another embodiment, the Brew system produced by Qualcomm could be used in a similar manner. That is, a version of the runtime engine 190 could be created that could communicate with Brew and, through Brew, with the operating system of a device 180 on which Brew has been installed. Again, 360-3D games executing in this manner might run more slowly than games being executed by an engine 190 embedded directly in an operating system but, again, many of the other advantages of the 360-3D game development method and system would be retained. One of skill in the art will recognize other ways in which 360-3D games could be executed on mobile devices 180 that do not have the runtime engine 190 embedded in their operating systems.

Java, Brew, and similar products could also be used as a means for distributing 360-3D games. A container file 160 could be provided in a Java wrapper, for example, so that the container 160 has interfaces compatible with Java. A Java-wrapped container 160 could be installed on a device with a Java-embedded engine 190 and could be read and executed as described above for native containers 160 and engines 190. Wrapping the container 160 in Java would allow 360-3D games to be distributed through the existing distribution channels by which other Java-based games are distributed, such as a web site through which games can be downloaded. To a user browsing the web site, the 360-3D games would appear to be standard Java-based games downloadable on existing systems.

As mentioned above, the images that are displayed on the screen 200 are stored in files that can be referred to as .pic files 140. The images in the .pic files 140 are pre-rendered images of all of the poses that might need to be displayed for all of the characters 260 and other objects in a 360-3D game. As is well known in the art, two general methods can be used to create high-quality graphics in video games: pre-rendering and the polygon and texture method. In the polygon and texture method, an object is depicted as a framework or mesh of polygons covered by a textured and colored surface. As the object is made to move on a video screen during the course of a game, algorithms calculate the way in which the mesh of polygons should change shape and the textured surface is then stretched out over the mesh of polygons to create the appearance of the desired motion. This process is referred to as rendering of Images of the object and is accomplished on the fly by the algorithms.

With pre-rendering, every image of every possible pose that an object might adopt during the course of a game is created during the development process for the game and stored. As the game is being played and the object is being made to move, the appropriate images are retrieved from memory and displayed at the appropriate times and in the appropriate places to create the appearance of the desired motion.

It can be seen that each method has advantages and disadvantages. With the polygon and texture method, large amounts of memory are not needed because images are created on the fly rather than being stored in memory. However, the algorithms used in this method are computationally intensive and a great deal of processing power is needed to execute the algorithms quickly enough to create realistic looking motion. Graphics accelerators may also be needed in the polygon and texture method. With pre-rendering, the processing power needed is not as great since images are simply recalled from memory rather than being generated on the fly. However, more memory may be needed to store the large number of pre-rendered images used to represent all the possible poses that an object might adopt.

In either case, for previously existing games with high-quality graphics to be played on mobile devices, the devices would typically need to be specially designed gaming devices with high-speed processors, graphics accelerators, and/or large memory capacities. Such devices might be prohibitively expensive for consumers who are mainly interested in the telephony or organizer features of the devices rather than the gaming features.

In an embodiment of the current system and method, a modified version of the pre-rendering method is used in that only the images needed to depict a limited set of desired motions are pre-rendered. A game developer can select a small number of motions that a character 260 will undertake during a game and then pre-render only the images needed to realistically depict those motions. Since the runtime engine 190 handles the scaling of images to different sizes, only one size of an image needs to be pre-rendered. The selected images can be compressed by a standard data compression routine to decrease their size. This pre-rendering and compression of a limited number of images creates graphics files that are small enough to fit on many mobile devices 180 and yet are capable of providing high-quality graphics. The processing power and graphics acceleration typically needed for the polygon and texture method and the large memory capacity typically needed for pre-rendering large numbers of images are eliminated.

The small size of the displays 200 on mobile devices 180 makes this pre-rendering technique practicable. Since the images that appear on the display 200 of a mobile device 180 are small in terms of the number of pixels used, a relatively small amount of memory is needed to hold high-quality compressed images. An adequate number of these small, high-quality images can easily fit within the memory capacity of many standard mobile devices 180. Images of similar quality displayed at a larger size on a larger screen, such as a typical computer monitor, would consume a large amount of storage capacity. Storing a large number of these larger high-quality images might require more storage capacity, but modern desktop computers tend to have ample storage capacity. As described below, 360-3D games could be played on a computer with the use of an emulator that could appear on a computer screen at approximately the same size as the display 200 of a mobile device 180.

The process of creating the .pic files 140 typically begins with a game developer creating, importing, and/or editing an appropriate set of images using a standard graphics manipulation program 110, for example True Space, Maya, LightWave, or 3DS Studio. The developer might then save the images as a set of graphics files 120 in the .tga format, for example one image per .tga file. The use of the .tga format provides high-quality graphics since .tga files support transparency, a property that allows a background image to be displayed through transparent portions of a foreground image. .tga files also support anti-aliasing, a property that allows the edges of objects to be smoothly rendered. While these properties provide realistic looking images, a drawback of the .tga format is that .tga files can be quite large. For example, a single picture might consume as much as seven megabytes of memory.

In an embodiment, the background panorama is defined in a .bmp file. The background .bmp file does not contain transparency information because the background by definition is not transparent—that is, nothing can be seen behind the background. The background panorama is contained of a continuous field that meets at the end to provide a 360° field of view. In an embodiment, the background panorama may comprise twelve display screens of horizontal range. In an embodiment, the first screen of display on a first end of the background panorama is duplicated as the last screen of display on the second end of the background panorama to make scanning to a point in the background easier. For example, the location of any screen of the background may be identified as the x and y coordinate of its left-most, upper-most pixel. It may be easier to display a screen starting at a location where the screen overlaps to the start of the panorama by reading entirely from a contiguous portion of the .bmp file than to read a first portion from the end of the .bmp file and splice on a second portion read from the start of the .bmp file, because of the image wrap-around dividing point. One skilled in the art will appreciate this problem and the utility of this convention for solving the problem.

The size of the graphics files used in 360-3D games is reduced in several ways. For example, a compression algorithm known as run length encoding is used to convert .tga files to .pic files 140. The run length encoding process decreases file sizes by specifying the number of consecutive pixels in an image that are transparent rather than each individual transparent pixel. Since a large portion of a typical image in a .tga file is transparent, file sizes can be decreased significantly by using this method rather specifying the transparency or non-transparency of each individual pixel in an image. A compression ratio of 10:1 might be achieved in the conversion of a .tga file to a .pic file 140 through run length encoding of pre-rendered images. The conversion of the .tga files into .pic files 140 through run length encoding occurs as part of the importing of the .tga graphics files 120 into the authoring tool 130. After using the graphics program 110 to generate the desired .tga files 120, a game developer might initiate the importing and conversion process by selecting a button, menu item, or similar mechanism in the authoring tool 130.

Also, the color of each pixel in a .tga file 120 is typically encoded in 24-bit color with eight bits for transparency for a total of 32 bits. Eight bits are used for red shades, eight bits are used for green shades, eight bits are used for blue shades, and eight bits are used to indicate a transparency level. The .tga files 120 are pre-rendered and converted to proprietary .pic files 140 which are 16-bit color format, which is all that is needed since most mobile devices only have 16-bit color displays. In 16-bit .pic file 140 data format, five bits are used for red shades, six bits are used for green shades, and five bits are used for blue shades, thereby reducing the number of bits used to encode color information by eight bits per pixel. It is known that the human eye is relatively more sensitive to color differences in the green region of the visible spectrum.

The conversion from the eight bit red, eight bit green, eight bit blue format (8R-8G-8B) to the five bit red, six bit green, five bit blue format (5R-6G-5B) is achieved through the truncation of the less significant bits from the 8R-8G-8B data. That is, the three least significant bits of red data, the two least significant bits of green data, and the three least significant bits of blue data are deleted for each pixel. Completely transparent portions in the .tga image are encoded in the .pic image by the run length encoding process. Feathered edges or other transparency information are maintained using 8-bits of transparency information.

The .pic file 140 includes packets of data which may be of three separate types. A packet identifier identifies each packet as having image data of one of these three separate types. The first type, which includes completely transparent portions of the image, are encoded out and have zero bytes. The second type, which includes the main opaque color portions of the image, are converted and encoded using 16-bits as described above. The third type, which includes the feathered edges around the main image and/or other partially transparent portions of the image, are converted and encoded using the 16-bits as described above plus an additional 8-bits for transparency—for a total of 24-bits for image portions that include transparency information.

Compression of a .tga file 120 into a .pic file 140 format through run length encoding allows high-speed uncompression when the .pic file 140 is to be rendered on a display screen 200. The rendering of a run length encoded file might actually be faster than the rendering of a uncompressed file since the rendering process can be skipped for multiple consecutive pixels that are transparent. The .pic files 140 are not immediately uncompressed when a 360-3D game is started up. As the runtime engine 190 retrieves .pic files 140 for display during a game, it uncompresses the images and almost immediately displays them on the fly. Such a fast uncompress would not be possible if a file format other than .tga (such as .jpg or .gif) had been used for the original graphics files 120.

Another conversion process occurs when the .pic files 140 are displayed on a computer screen in the emulator portion 920 of the authoring tool 130. Images in the .pic files 140 are in the 16-bit format described above, but typical desktop computers, such as Windows-based computers, display images in a 24-bit format where eight bits are used for each color. Therefore, Windows-based computers cannot read .pic files 140 directly. To display the .pic files 140 on a computer 170, a conversion is done in which the least significant bits for each color in each pixel in a .pic file 140 are padded with zeroes so that eight bits are used for each color. That is, the five bits in the red portion of the data for a pixel are shifted three bits to the left, the six bits in the green portion of the data for a pixel are shifted two bits to the left, and the five bits in the blue portion of the data for a pixel are shifted three bits to the left. Three zeroes are then added to the right side of the five red bits, two zeroes are added to the right side of the six green bits, and three zeroes are added to the right side of the five blue bits. Although the images in .pic files 140 are displayed on a computer 170 in 24-bit format, the images only have 16-bit quality, so a developer will see an image in the emulator 920 that has the same appearance it will have when it is displayed on a mobile device 180.

A Windows-based computer 170 is able to read the video data converted in this manner and display the data properly in the emulator 920. The quality of the image in the emulator 920 will be substantially equivalent to the quality that will appear on the screen 200 of the mobile device 180 since sixteen bits of usable data are displayed in each case.

This conversion can take place during the double buffering process that is commonly used to display images on the video monitor of a computer 170. In double buffering, as is well known to those skilled in the art, an image is constructed in a first memory buffer while the image stored in a second memory buffer is displayed on a monitor or other display device. When the monitor or display is next updated, the image stored in the first memory buffer is then displayed on the monitor or display device while the next image is constructed in the second memory buffer. Buffering the images in this manner prevents a flickering effect that could occur if an image were built directly on a monitor.

In an embodiment, the conversion from the 16-bit color .pic format to the 24-bit color format takes place during the transfer of a built-up image from the first buffer to the second buffer. That is, an off-screen 16-bit color image is built up in the first buffer, the image is converted to the 24-bit color format, and the 24-bit color image is transferred to the second buffer. This ensures that the conversion from the mobile device-based format to the computer-based format occurs at the last possible moment before the image is displayed. The conversion is done only on the .pic-based image and not the .pic file 140 that contains the image. Since there is no need to convert the actual .pic files 140 into a format that is readable by the computer 170, a game developer using the authoring tool 130 can work with the same .pic files 140 that will be used by a mobile device 180 during the playing of a 360-3D game. This assures that a game created on the authoring tool 130 will appear on the screen 200 of a mobile device 180 almost exactly as it appeared on the emulator 920.

As mentioned previously, in addition to the type of gaming action already described, 360-3D games can be played in a multi-player mode. Two or more players can play with or against each other at the same time on different mobile devices 180. The devices 180 would typically be able to communicate with each other wirelessly via WiFi, Bluetooth, or some other wireless communication technology. Wired communication could also be used. Substantially the same panorama 220 is viewable by all of the players but each player is capable of viewing and interacting with a different section of the panorama 220. From the perspective of a first player, it would appear that a second player is in the same position as the first player but that the second player is spinning, aiming, and shooting independently.

All runtime engines 190 on all types of devices 180 are substantially identical and all containers 160 for a particular game are substantially identical. Therefore, two real players playing the same game on different mobile devices 180 would see the same initial screen 200 when the engine 190 on each device 180 begins reading and executing the initial command.act file on each device 180. In an embodiment, each player's keystrokes are sent wirelessly to the other player's device 180 every time a frame is read and the keystrokes are processed by the engine 190 on the other player's device. Both engines 190 start reading and executing the same command.act file at the same moment and thereafter receive the same inputs from the keypads. Therefore, the same .acts 150 will be read and executed by both engines 190. If further .acts 150 are spawned, the same .acts 150 will be spawned at the same time by both engines 190. In this way, all of the .acts 150 being read and executed by one engine 190 will be read and executed at the same frames by the other engine 190. The two games on the two devices 180 are thus synchronized frame for frame.

The synchronization of the two games means that the overall 360° scene that is present in the panorama 220 created by each engine 190 is substantially identical for both players. However, since each virtual player 210 can spin independently of the other virtual player 210 within the panorama 220, each virtual player 210 can see a different section of the panorama 220 and the display that each real player sees on the screen 200 of his device 180 can be different.

Each real player can also move his crosshairs 270 up and down independently of the other player. Since the crosshairs 270 remain centered left and right as a virtual player 210 spins and since each virtual player 210 can spin independently of the other, both the up and down and the left and right positions of one virtual player's crosshairs 270 can be set independently of the other virtual player's crosshairs 270. Thus, each virtual player 210 can shoot at different characters 260 than the other virtual player 210. Each virtual player's crosshairs 270 will appear on the screen 200 of the other player when they are both looking at about the same location on the 360-degree panorama. Each virtual player's crosshairs 270 may be distinguished from each other, for example by different colors.

When a first real player hits a key on his device 180 to take a shot, the keystroke will be transmitted to the second real player's device 180. The engine 190 on the second device 180 will process the keystroke in the same manner as the engine 190 on the first device 180. Thus, any additional .acts 150 that might be launched as a result of the first player's shot, will be launched at the same moment in both engines 190 on both devices 180. Each engine 190 will then continue to process the additional .acts 150 in synchronization with the other engine 190. Starting the .acts 150 at the same frame at the same time, reading and executing the .acts 150 at the same rate, and using the keystrokes from both devices 180 as inputs into both engines 190 is sufficient to keep the engines 190 synchronized. In the preferred embodiment, no data other than the keys pressed by each player needs to be exchanged by the two devices 180 to maintain synchronization between the two engines 180 for multi-player gaming. In the present embodiment, only four bytes of data are needed to communicate the keystroke information between the devices 180 for multi-player gaming.

While the runtime engines 190 on all devices 180 used in a multi-player game read and execute the same .acts 150 in synchronization, there are some differences in the data stored by each engine 190. The engine 190 on each device 180 can use a module that can be referred to as the 'buddy module' to keep track of player-specific data for each player. For example, when a player kills a character 260, the buddy modules register which player scored the points and add the points to the appropriate player's point total. The buddy modules can also ensure that the appropriate scores 290 for each player appear in the appropriate places in the display screen 200. In addition, the buddy modules can keep track of and properly display the different radars 280 that appear in the displays 200 of the different players.

As an example of how the engines 190 on two different devices 180 might execute the same multi-player game, a first player might select the multi-player mode of a game. When a second player whose device 180 is in communication with the first player's device 180 selects the multi-player mode of the same game, a synchronization component in one of both of the players' devices 180 ensures that the first frame of the initial command.act file for the game is read by the engine 190 on each device 180 at about the same moment. Thereafter, since each engine 190 reads the subsequent frames in each command.act file at the same rate, the same frames in the command.act file are read by each engine 190 the same moment.

When a first real player hits a key on his device 180 to take a shot, the keystroke is transmitted to the second real player's device 180. The engine 190 on the second device 180 will process the keystroke in the same manner as the engine 190 on the first device 180. For example, if the first player's shot kills a first character 260, a first .act 150a controlling the first character 260 might launch a second .act 150b that spawns a second character 260. Since the first .act 150a is executing at the same frame on both players' devices 180 and since both devices 180 receive the same inputs at about the same time from the keypads of both devices 180, the first player's shot will cause the second .act 150b to begin executing on both devices 180 at the same time. The engines 190 on both devices 180 will then read and execute the second .act 150b at the same time frame by frame. Additional keystrokes by either real player might cause additional .acts 150 to begin execution substantially simultaneously on both devices 180. These additional .acts 150 and any further .acts 150 that they launch will be launched on both devices 180 and will be read and executed by both engines 190 synchronously throughout the game.

The buddy modules ensure that the first player is credited with killing the first character 260. As each player scores points, the buddy modules add the points to the appropriate player's total.

As mentioned above, the runtime engine 190 is typically embedded in the operating system of a mobile device 180. Alternatively, the engine 190 might communicate with a device's operating system through several layers of software such as Java or Brew. Since the engines 190 installed on devices 180 operating under different platforms are substantially identical, players with disparate mobile devices 180 can participate in multi-player games.

Also, a player with a mobile device 180 might be able to participate in a multi-player game with a player using a computer. The emulator 920 described above as part of the authoring tool 130 is typically used in the creation of 360-3D games. However, the emulator 920 could easily be modified to be a stand-alone component that can execute 360-3D games on a computer. When such a modified emulator 920 is installed on a computer that has the necessary hardware to communicate with a mobile device 180, for example a WiFi interface, a player using a computer and a player with a mobile device 180 could participate in a multi-player game.

The conversion process described above wherein images in the mobile device-based 16-bit color format are converted to images in the Windows-based 24-bit color format would allow substantially identical .pic files 140 and .act files 150 to be used by both the computer and the mobiles device 180 and allow a Windows-based computer to participate in a multi-player game with a mobile device 180.

The display screens 200 on different types of devices 180 might have different sizes. For instance, the display on a PDA is generally larger than the display on a mobile telephone. In an embodiment, the images that appear in a 360-3D game are not scaled in proportion to the size of the display 200 on which they appear. That is, a scene that fits in a smaller display is not scaled up to fit in a larger display and a scene that fits in a larger display is not scaled down to fit in a smaller display. A particular image would be displayed at the same size in terms of pixels, regardless of whether it is displayed on a PDA or a mobile telephone. To compensate for the difference in size of different displays, additional portions of a scene are visible on a larger display that are not visible on a smaller display.

Figure 9:
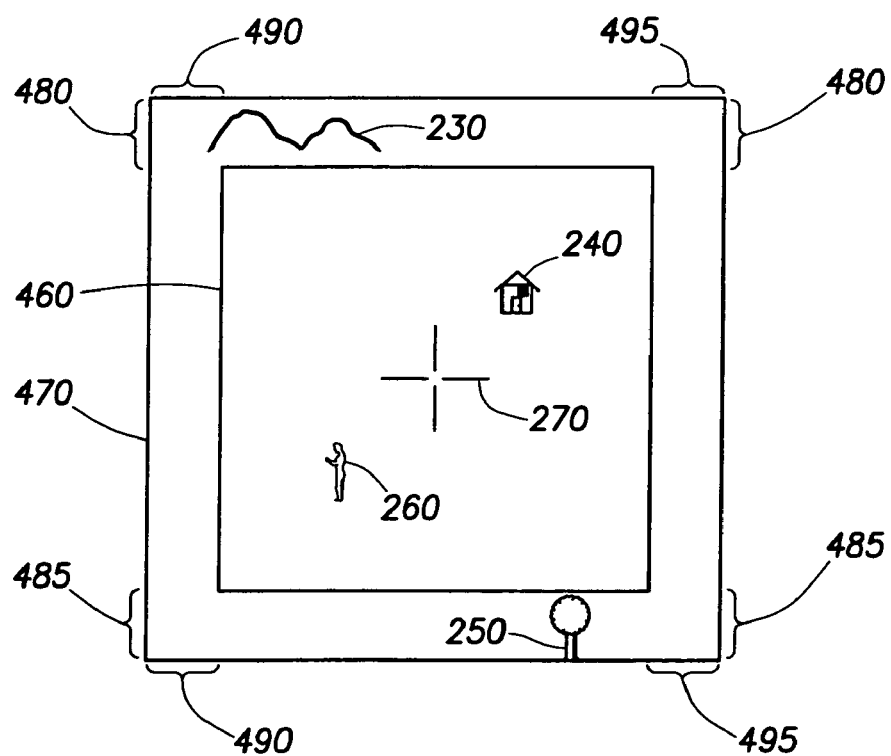
FIG. 9 illustrates the display of images on screens of different sizes according to an embodiment of the present disclosure.

This is illustrated in FIG. 9, where a smaller, mobile telephone-sized display 460 is shown superimposed on a larger, PDA-sized display 470. A player playing on a mobile telephone would see only the portion of a scene that appears within the box 460. A player playing the same game on a PDA and looking in the same direction would see the portion of the scene that appears within the box 460 and would also see additional portions of that scene. Namely, the player with the PDA would also see an upper horizontal portion 480 at the top of the scene, a lower horizontal portion 485 at the bottom of the scene, a vertical portion 490 to the left of the scene, and a vertical portion 495 to the right of the scene. These additional portions fit seamlessly with the scene in the smaller display 460 to create a larger view of that scene. In other words, the smaller display 460 can be viewed as a cutout of the central portion of the larger display 470.

If a player with a PDA and a player with a mobile telephone were playing a multi-player game and both players had their virtual players 210 turned in the same direction, both would see the same scene in the smaller area 460. For example, both players would see the building 240 and the character 260 and these images would be the same size on both displays. However, the player with the PDA would also see the mountain 230 in the upper horizontal portion 480 and the tree 250 in the lower horizontal portion 485. These images would not be visible to the player with the mobile telephone because the upper horizontal portion 480 and the lower horizontal portion 485 are not present on his display 460.

In some embodiments, the upper horizontal portion 480 and the lower horizontal portion 485 are merely extensions of the background image and no activity or action can occur in those portions. In other embodiments, the upper horizontal portion 480 and the lower horizontal portion 485 are active areas that characters 260 can move into and out of and action may take place. In some embodiments, the upper horizontal portion 480 is an extension of a homogenous field, for example sky, and the lower horizontal portion 485 is an extension of a homogenous field, for example sand.

In some embodiments, the radar 280 and the scores 290 appear in the smaller display area 460 regardless of whether a game is played on a device 180 with a smaller display 460 or a device 180 with a larger display 470. In other embodiments, the radar 280 and the scores 290 appear in the smaller display area 460 on devices 180 with smaller displays 460 and appear in the upper horizontal portion 480 and the lower horizontal portion 485 on devices 180 with larger displays 470.

When players with disparate mobile devices 180 participate in a multi-player game, a first player might have a first device 180 that has a larger display screen 470 than the display screen 460 on a second device 180 used by a second player. If the entire display area 470 of the first device 180 were allowed to remain fully active, the first player might have an advantage. That is, the first player might be able to shoot at characters 260 in the upper horizontal portion 480 and the lower horizontal portion 485 that would be invisible to the second player and could thus earn points that are unavailable to the second player.

To eliminate this disparity, the crosshairs 270 on the screen 470 of the first device 180 could be prevented from entering the upper horizontal portion 480 and the lower horizontal portion 485 of the screen 470 on the first device 180. These portions would still be visible to the first player and the first player might be able to observe characters 260 moving into and out of the portions, but the first player could not shoot at the characters 260 in those portions. In this way, the points available to the two players could be made equal. It would not be necessary to prevent the movement of the crosshairs 270 into the left vertical portion 490 and the right vertical portion 495 since those areas would be visible to the second player by spinning to the left or right.

Figure 10:
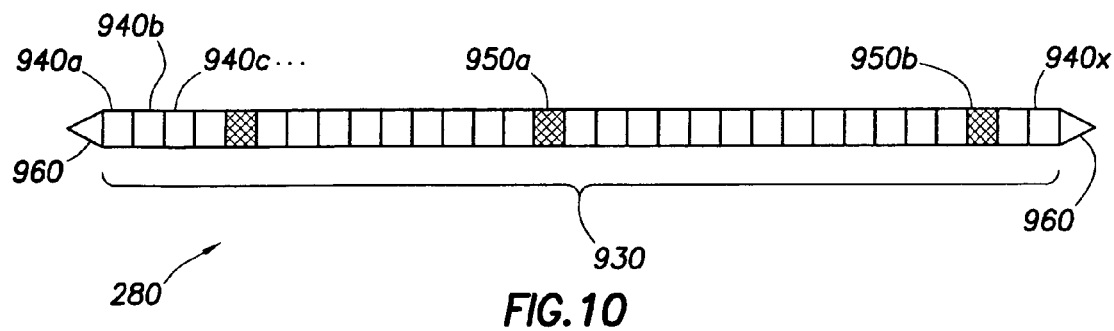
FIG. 10 illustrates a radar used in games according to an embodiment of the present disclosure.

The radar 280 that appears in the screen of a mobile device 180 helps a real player in a single-player or multi-player game to determine the locations of characters 260 that can inflict damage on a virtual player 210. FIG. 10 illustrates a radar 280. The radar 280 is built into the engine 190 and behaves substantially the same for each different 360-3D game. The radar 280 can take the form of a horizontal bar 930 containing a set of equal-sized sectors 940. The length of the bar 930 corresponds to the circumference of the panorama 220 and each sector 940 in the bar 930 corresponds to a proportionately sized sector in the panorama 220. The center of the bar 930 corresponds to the portion of the panorama 220 directly in front of the virtual player 210. The leftmost sector 940$a$ of the bar 930 and the rightmost sector 940$x$ of the bar 930 can be viewed as overlapping each other and both represent the portion of the panorama 220 that is 180° behind the virtual player 210. Thus, the two-dimensional bar 930 symbolizes the three-dimensional 360° view within the panorama 220.

The sectors 940 within the radar can change colors or become similarly highlighted to indicate the position of a character 260 that is shooting at a virtual player 210. (A character 260 that is actively shooting will be referred to hereinafter as an enemy to distinguish such a character 260 from a character 260 that is not currently capable of inflicting damage on a virtual player 210.) For example, a highlighted sector 950$a$ near the center of the bar 930 can indicate an enemy in front of the virtual player 210. A highlighted sector 950$b$ at the far right of the bar 930 might indicate an enemy to the right of the virtual player 210 but outside the currently visible area of the screen 200. As the virtual player 210 spins within the panorama 220, the highlighted sectors 950 in the bar 930 move to indicate the changes in the position of the virtual player 210 relative to the positions of the enemies.

The highlighted sectors 950 in the bar 930 can change colors or shading to indicate the amount of damage that the enemies are inflicting on the virtual player 210. In an embodiment, it is assumed that every shot taken by an enemy hits the virtual player 210. As an enemy shoots at the virtual player 210, the damage to the virtual player 210 accumulates and, if the damage reaches a threshold, the virtual player 210 dies and the game ends. Each shot taken by an enemy might cause the highlighted sector 950 that corresponds to the position of that enemy to become darker or redder, as examples. A real player can observe the color or shading of the highlighted sectors 950 in the radar 280 to learn the positions of the enemies that present the greatest threat.

A highlighted sector 950 that is dark, for example, might represent an enemy that has inflicted a greater amount of damage on the virtual player 210 than an enemy represented by a highlighted sector 950 that is light. It may be preferable to kill the enemy that has inflicted the greater amount of damage before killing the other enemy since the enemy that has inflicted the greater amount of damage is closer to killing the virtual player 210. In an embodiment, when the virtual player 210 kills an enemy, the highlighted sector 950 that represents the position of the enemy loses it highlighting to indicate that the killed enemy no longer poses a threat and that the damage level inflicted by the enemy on the virtual player 210 has been reset to zero. Thus the damage may only accumulate on a per sector basis.

In an embodiment, arrows 960 or pointers can be located at the ends of the bar 930 to provide the real player with an indication of which direction the virtual player 210 should turn in order to deal with the greatest threat. For example, if the total amount of damage that has been inflicted by enemies on the virtual player's left side is greater than the total amount of damage that has been inflicted by enemies on the virtual player's right side, the arrow 960 on the left side of the bar 930 might become highlighted, begin flashing, or give some other indication that the virtual player 210 should focus his attention to the left.

The functions of the radar 280 are controlled by the runtime engine 190. As an enemy shoots at the virtual player 210, the power level of each shot is reported to the engine 190 and the engine 190 updates the radar 280 with a new total damage level that the enemy has inflicted on the virtual player 210. This damage level is reflected in the highlighting in the radar 280. When the virtual player 210 kills an enemy, the engine 190 removes the highlighting from the sector 940 of the bar 930 that represented the position of the killed enemy. In a multi-player game, the buddy modules in each player's engine 190 control the appearance of each player's radar 280.

Figure 11:
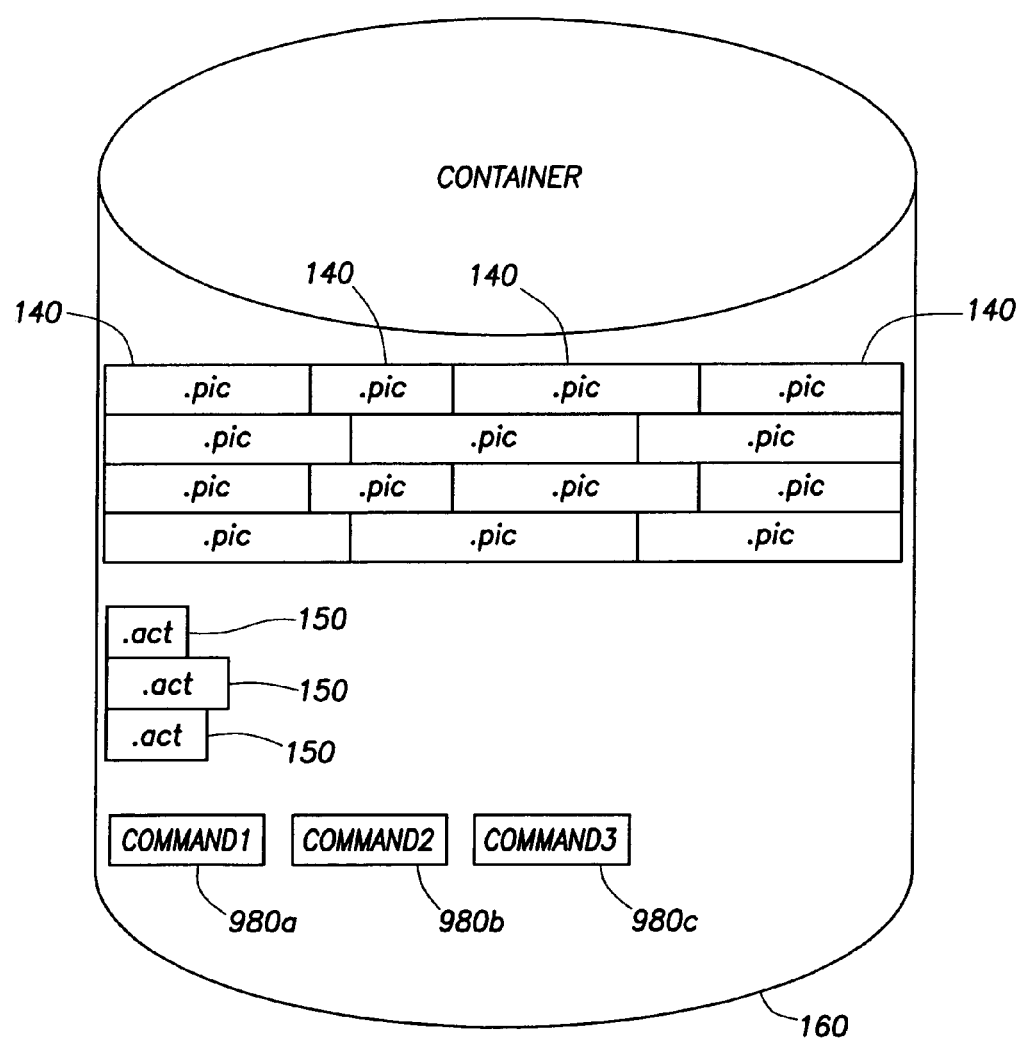
FIG. 11 illustrates a container of files used in games according to an embodiment of the present disclosure.

In the present embodiment as mentioned above, a file that can be referred to as the container 160 holds all of the .pic files 140 and all of the .act files 150 that might be used in the course of a game. The container 160 also holds the command files that specify the .act files 150 that will be executed when a new game is started or when a new level of a game is reached. FIG. 11 illustrates a typical container 160. It can be seen that the .act files 150 are relatively small files since they contain only pointers to the .pic files 140 and other data elements that consume only a few bytes of memory each. Since each frame of an .act 150 uses 32 bytes of memory, the actual size of an .act file 150 will depend on the number of frames in the .act 150. It is anticipated that a typical .act file 150 will have a size under approximately one kilobyte. The number of .act files 150 used by a 360-3D game depends on the complexity of the game.

A .pic file 140 typically requires more memory than an .act file 150, with the size of the .pic file 140 depending on the complexity of the image contained therein. It is anticipated that .run length encoding will give a typical .pic file 140 a size of approximately ten kilobytes. The number of .pic files 140 used by a 360-3D game depends on the number of different characters 260 that will be used in the game and the number of different poses that the characters 260 will adopt.

It should be noted that the number of .pic files 140 needed is not dependent on the number of different activities launched based on the same .act file 150. For example, five activities of a running soldier launched from the same .act file 150 will each be generated from the same one set of .pic files 140 referenced by the common .act file 150. No matter how many different activities are launched based on a single .act 150, and hence how many different versions of a character 260 are visible, only one set of .pic files 140 is needed to depict a particular movement of the character 260. By contrast, using the polygon and texture method described above, additional characters 260 would likely require additional memory committed to the meshes and textures of each additional character 260. Each .act 150 merely uses pointers to the .pic files 140 that depict the character 260 and as many pointers as desired can simultaneously point to the same .pic file 140. Thus multiples of the same characters 260 may be provided at various locations in the game performing similar actions, such as running and shooting, without consuming additional memory or requiring additional storage capacity.

Also note that each activity runs independently and may exhibit a different behavior from other activities launched based on the same .act file 150, for example because the subject activity experiences different events such as being shot.

The command files 980 also consume only a minimal amount of memory since they contain only a set of .act files 150 that are launched at the beginning of each level of a game. Based on these considerations, it can be seen that a container 160 does not consume a great deal of memory space on a mobile device 180. Recall that the container 160 contains the complete specification or description of a 360-3D game. It is anticipated that a typical container 160 will have a size in the range of approximately two to three megabytes. This allows 360-3D games to be played on standard mobile devices 180 that have not been specially enhanced for gaming, since such devices 180 typically have a memory capacity of less than five megabytes.

In an embodiment, the .pic files 140 in the container 160 can be arranged sequentially to make development of 360-3D games easier. As mentioned above, a game developer can use the append button 790 in the authoring tool 130 to increment the frame number and simultaneously specify that the next .pic file 140 in the current directory is to be called by the next frame. In order for the append button 790 to work properly, the .pic files 140 must be arranged in the proper order in the container 160. For example, if a running motion is to be depicted, the .pic file 140 containing the first running pose should be listed first in a directory of .pic files 140 in the container 160, the .pic file 140 containing the second running pose should be listed second, and so on.

The ability to play 360-3D games on a computer through the use of the emulator 920 suggests various marketing strategies for 360-3D games. For example, a demonstration version of a 360-3D game might be made available for free for play on a computer. This might be displayed on a computer monitor as a mobile phone, whereon the display of the mobile phone the game may be played. These demos could be downloaded, for example for low or no cost. Playing the limited version of a game on a computer might encourage game players to purchase the full version for use on a mobile device 180, or to purchase mobile devices 180 with the engine 190 able to play the 360-3D games.

Figure 12:
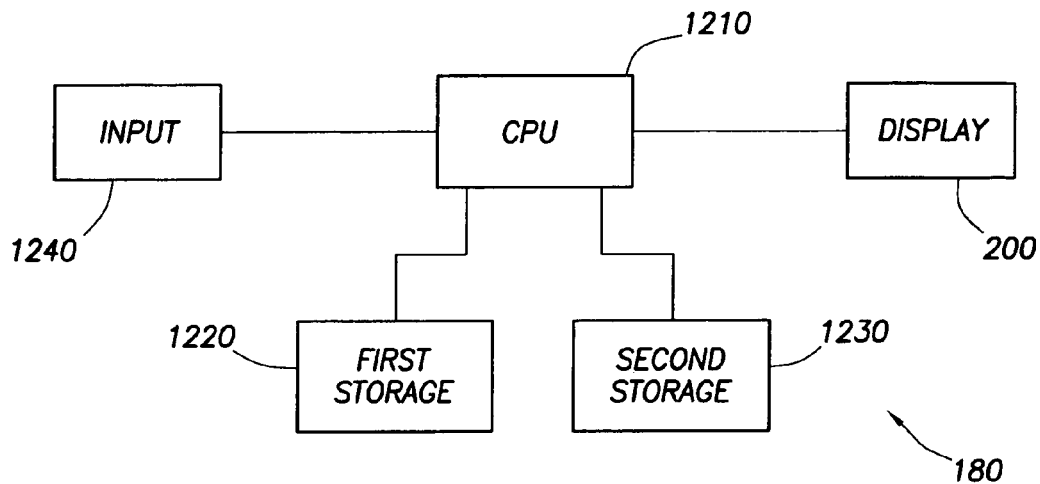
FIG. 12 illustrates a block diagram of a mobile device operable for some of the various embodiments of the present disclosure.

The system described above may be implemented on any hand-held mobile electronic device 180 such as is well known to those skilled in the art. An exemplary mobile handset system 180 for implementing one or more embodiments disclosed herein is illustrated in FIG. 12. The mobile handset 180 includes a processor 1210 (which may be referred to as a central processor unit or CPU) that is coupled to a first storage area 1220, a second storage area 1230, an input device 1240 such as a keypad, and an output device such as a display screen 200.

The processor 1210 may be implemented as one or more CPU chips and may execute instructions, codes, computer programs, or scripts that it accesses from the first storage area 1220 or the second storage area 1230. The first storage area 1220 might be a non-volatile memory such as flash memory. A container 160 and other mobile handset 180 data would typically be installed in the first storage area 1220. The second storage area 1230 might be firmware or a similar type of memory. The runtime engine 190 and the device's operating system would typically be installed in the second storage area 1230.

The authoring tool 130 described above may be implemented on any general-purpose computer with sufficient processing power, memory resources, and network throughput capability to handle the necessary workload placed upon it.

Figure 13:
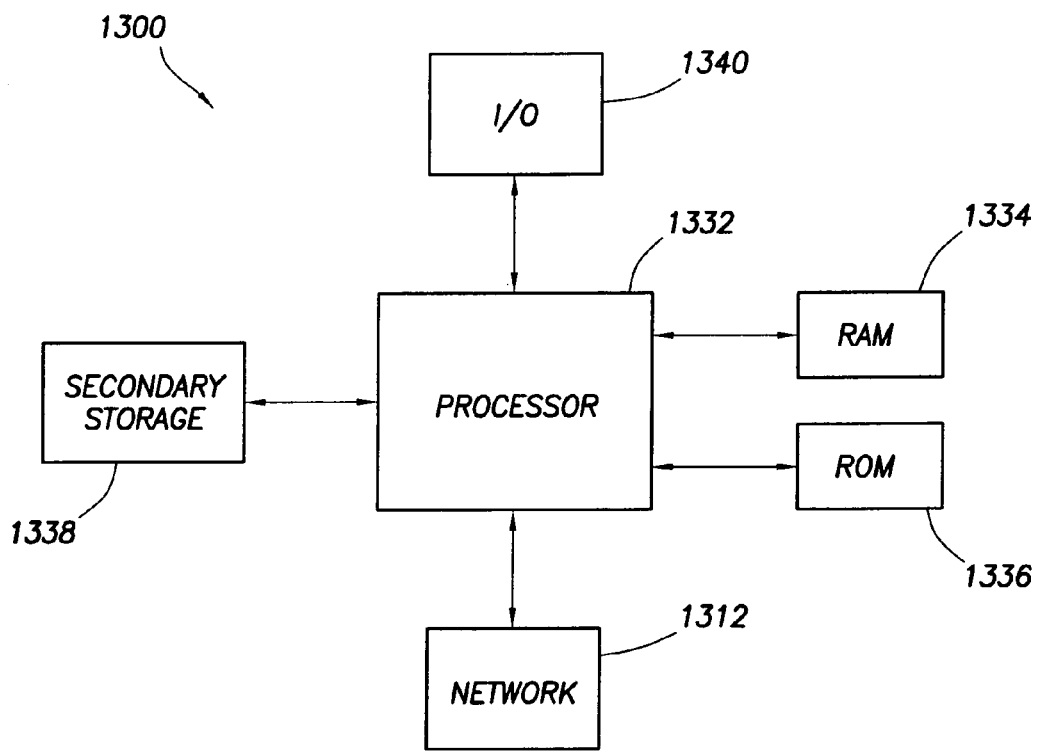
FIG. 13 illustrates a block diagram of a computer system operable for some of the various embodiments of the present disclosure.

FIG. 13 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system for 3-dimensional gaming on a mobile handset, comprising:
   a converter component operable to convert a pre-rendered 3-dimensional graphic image having 24-bit color resolution to a 3-dimensional graphic image having 16-bit color resolution, the component further operable such that the 3-dimensional graphic image having 16-bit color resolution is run length encoded; and
   a mobile handset game operable to use the 3-dimensional run length encoded graphic image having 16-bit color resolution for display on a handset as part of the mobile handset game.

2. The system of claim 1, further comprising a tool operable to create a 3-dimensional graphic image having 24-bit color resolution, the tool further operable to pre-render the 3-dimensional graphic image having 24-bit color resolution.

3. The system of claim 2, wherein the tool is further operable to store the 3-dimensional graphic image having 24-bit color resolution as .tga file format, including 8-bits of transparency per pixel.

4. The system of claim 3, wherein the converter is further defined as operable to convert the .tga file format to the 3-dimensional graphic image having 16-bit color resolution.

5. The system of claim 1, wherein converting the pre-rendered 24-bit 3-dimensional graphic image to an 16-bit 3-dimensional graphic image is further defined as converting 8-bit Red, 8-bit Green, and 8-bit Blue (24-bit 8-8-8 RGB) to 5-bit Red, 6-bit Green, 5-bit Blue (16-bit 5-6-5 RGB).

6. The system of claim 5, wherein converting the pre-rendered 24-bit 3-dimensional graphic image to an 16-bit 3-dimensional graphic image is further defined as using the first 5 most significant bits of the 8-bits of Red, using the 6 most significant bits of the 8-bits of Green, and using the 5 most significant bits of the 8-bits of Blue to convert from 8-8-8 RGB to 5-6-5 RGB.

7. The system of claim 1, wherein run length encoding the 16-bit 3-dimensional graphic image is further defined as including transition encoding to compress the 16-bit 3-dimensional graphics image.

8. The system of claim 1, wherein the mobile handset game is further defined as having a 360-degree view wherein a player is positioned in a fixed center of the 360-degree view and the player's view is operable for 360-degree rotation about the fixed center position of the game.

9. The system of claim 1, further comprising a mobile handset operable to play the mobile handset game and wherein the mobile handset is further defined one of a mobile phone and a personal digital assistant.

10. A method for 3-dimensional gaming on a mobile handset comprising:
creating 3-dimensional graphic images of each view of a character for a 3-dimensional game;
pre-rendering each of the graphics images of the character;
converting each of the pre-rendered graphic images from a 24-bit color image to a 16-bit color image:
run length encoding at least a portion of each of the pre-rendered graphics images; and
displaying at least some of the run length encoded pre-rendered graphic images on the mobile handset as part of a game on mobile handset at about 15 frames per second.

11. The method of claim 10, further comprising displaying at least some of the run length encoded pre-rendered graphic images on the mobile handset as part of the game on the mobile handset at a rate of at least 15 frames per second.

12. The method of claim 11, wherein the game is further defined as a first person shooter game wherein player is provide in a center of a 360-degree scene and operable for substantially only about rotation about the center of the 360-degree scene.

13. A data file structure for graphics images for 3-dimensional gaming on a mobile handset, the data file structure obtained according to a method comprising:
converting a plurality of pre-rendered 3-dimensional images having 24-bit color resolution to 3-dimensional graphics images having 16-bit color resolution;
run length encoding the 3-dimensional graphics images having 16-bit color resolution; and
saving the 3-dimensional graphics images having 16-bit color resolution for display for gaming on the mobile handset.

14. The data file structure obtained according to the method of claim 13, further comprising:
using a tool to create a plurality of 3-dimensional graphic images having 24-bit color resolution for use in a game for mobile handsets; and
pre-rendering the 3-dimensional graphics images having 24-bit color resolution.

15. The data file structure obtained according to the method of claim 14, further comprising using the tool to pre-render the 3-dimensional graphic images having 24-bit color resolution.

16. The data file structure obtained according to the method of claim 15, further comprising saving the pre-rendered graphics tile image as .tga file format.

17. The data file structure obtained according to the method of claim 13, wherein the pre-rendered 3-dimensional images having 24-bit color resolution further includes 8-bit per pixel for alpha channel anti-aliasing.

18. The data file structure obtained according to the method of claim 13, wherein the run length encoding is further defined as compressing the 3-dimensional graphics images having 16-bit color resolution at a compression rate of approximately 10 to 1 or greater.

19. The data file structure obtained according to the method of claim 13, wherein converting the pre-rendered 3-dimensional graphic images having 24-bit color resolution to 3-dimensional graphic images having 16-bit color resolution is further defined as converting 8-bit Red, 8-bit Green, and 8-bit Blue (24-bit 8-8-8 RGB) to 5-bit Red, 6-bit Green, 5-bit Blue (16-bit 5-6-5 RGB).

20. The data file structure obtained according to the method of claim 19, wherein converting the pre-rendered 3-dimensional graphic images having 24-bit color resolution to a 3-dimensional graphic images having 16-bit color resolution is further defined as using the first 5 most significant bits of the 8-bits of Red, using the 6 most significant bits of the 8-bits of Green, and using the 5 most significant bits of the 8-bits of Blue to convert from 8-8-8 RGB to 5-6-5 RGB.

21. The data file structure obtained according to the method of claim 13, wherein the pre-rendered 3-dimensional images having 24-bit color resolution represent transparency using 8bits per pixel and wherein the run length encoding is further defined as encoding the transparency information of the pre-rendered 3-dimensional images having 24-bit color resolution.

* * * * *

UNITED STATES PATENT AND TRADEMARK OFFICE
CERTIFICATE OF CORRECTION

| | | |
|---|---|---|
| PATENT NO. | : 7,400,329 B2 | Page 1 of 1 |
| APPLICATION NO. | : 11/393214 | |
| DATED | : July 15, 2008 | |
| INVENTOR(S) | : David C. Edwards | |

It is certified that error appears in the above-identified patent and that said Letters Patent is hereby corrected as shown below:

On the cover of the patent in paragraph (60) under Related U.S. Application Data, delete "60/694,569" and replace with --60/694,659--;

Column 1, line 11, delete "60/694,569" and replace with --60/694,659--.

Signed and Sealed this

Twenty-ninth Day of June, 2010

David J. Kappos
*Director of the United States Patent and Trademark Office*